April 7, 1953  R. J. PETERS ET AL  2,634,121
APPARATUS FOR HANDLING AND SURFACE-HARDENING ARTICLES
Filed Dec. 15, 1948  12 Sheets-Sheet 3
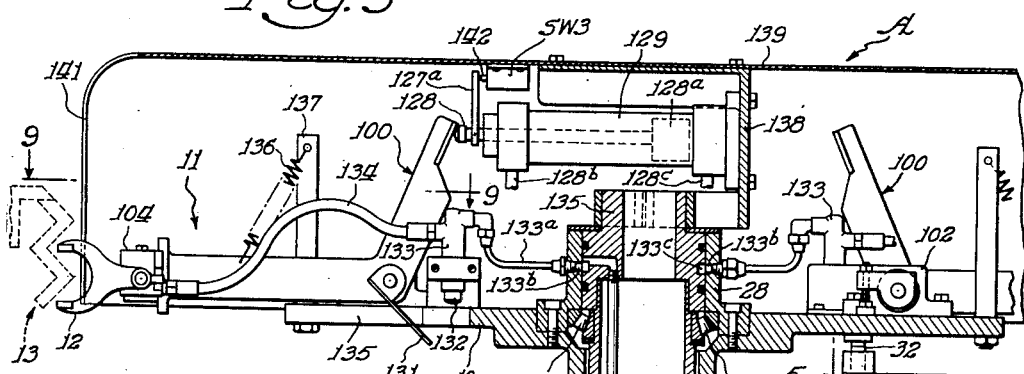
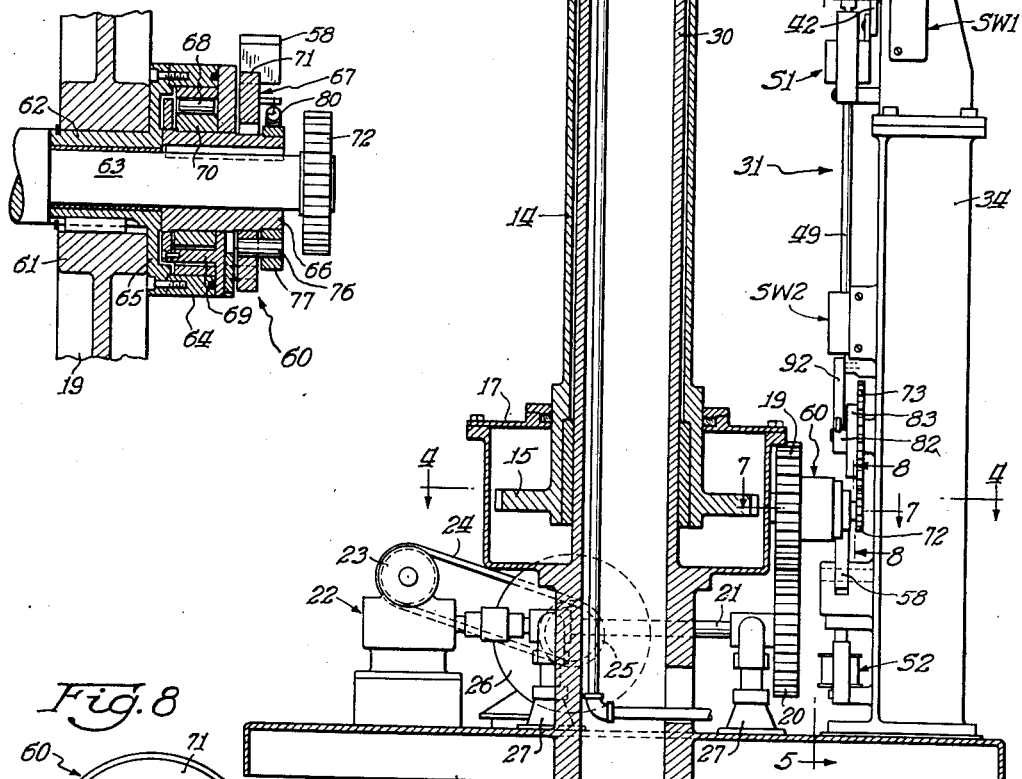
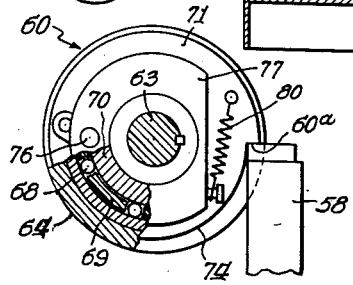
Inventors:
Robert J. Peters
John R. Guenther and
Joseph W. Pollard

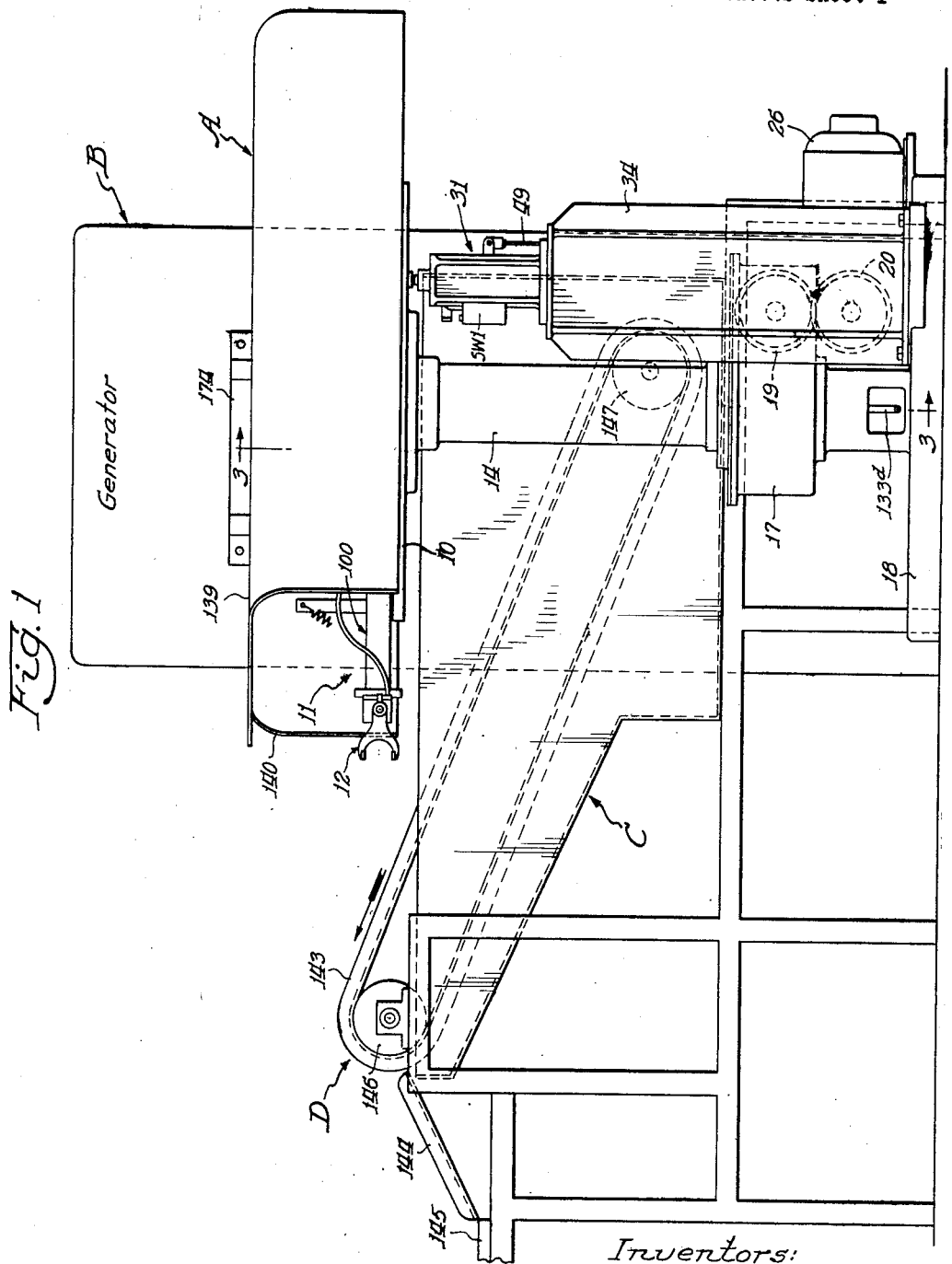

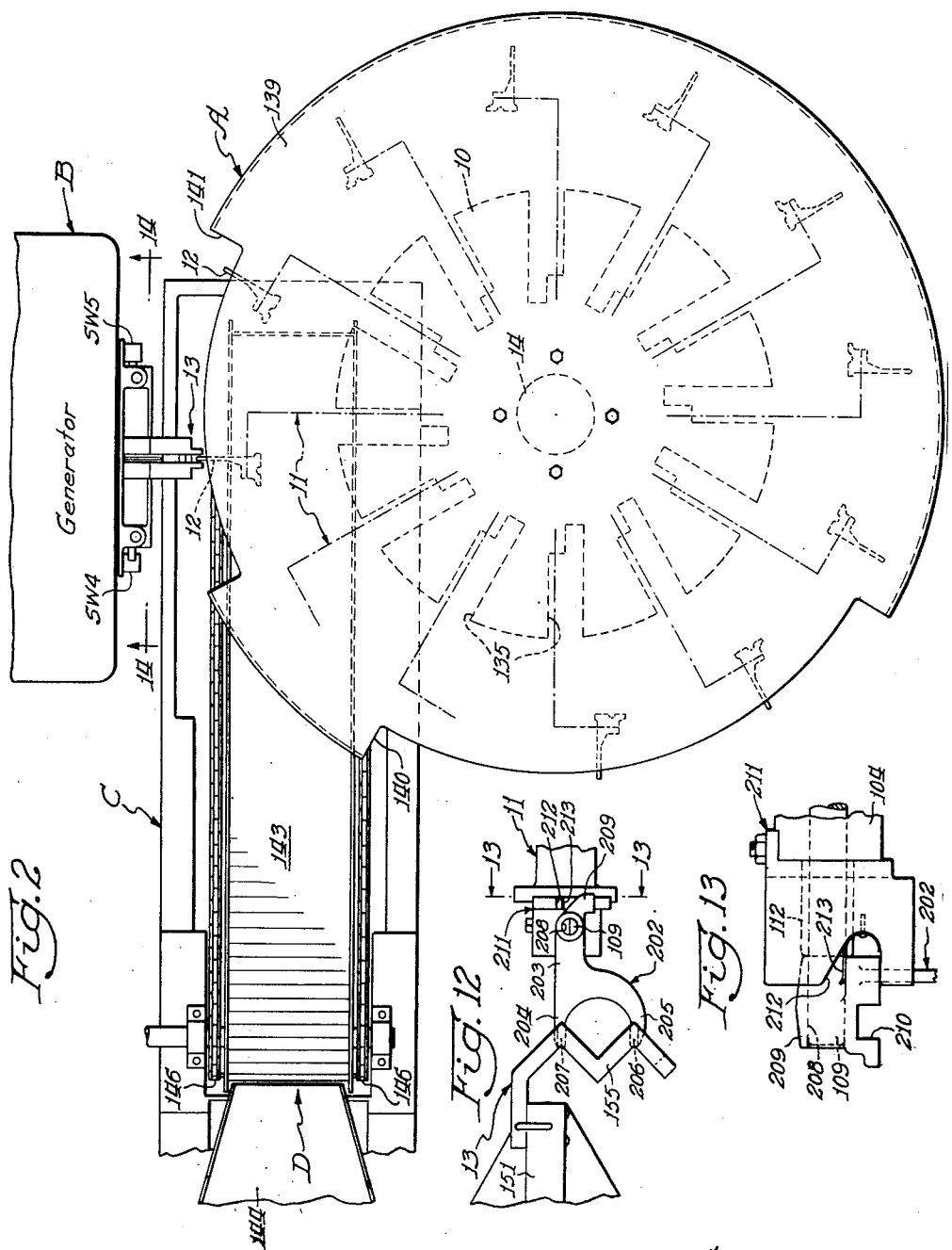

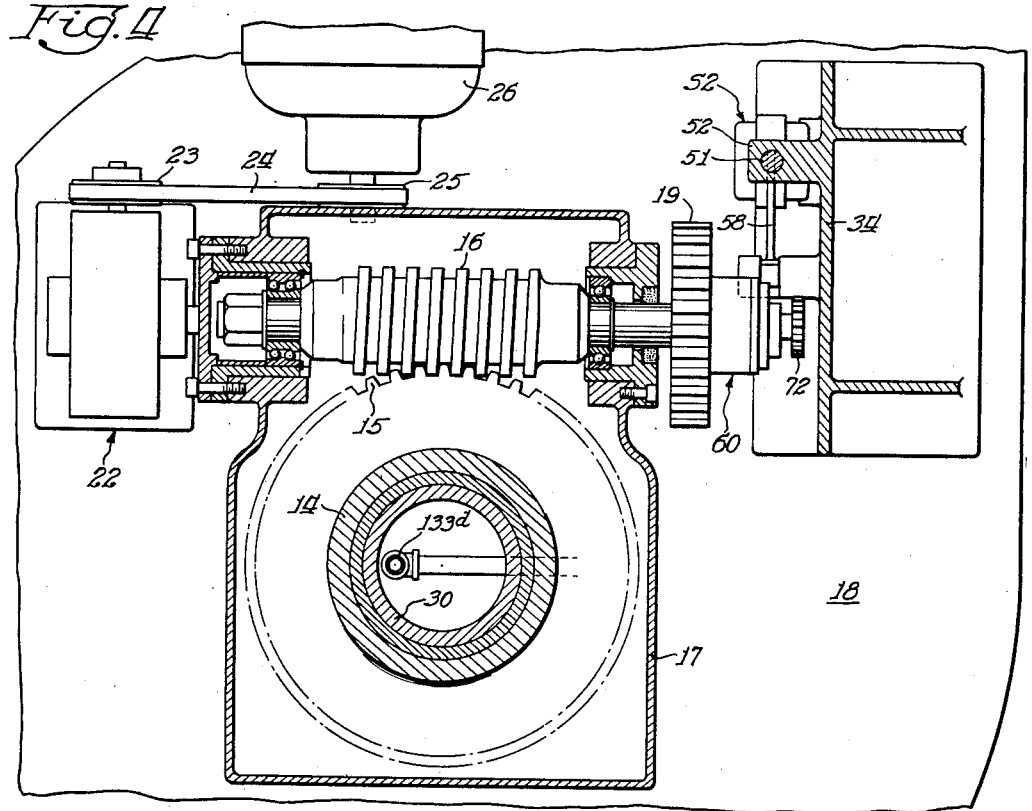
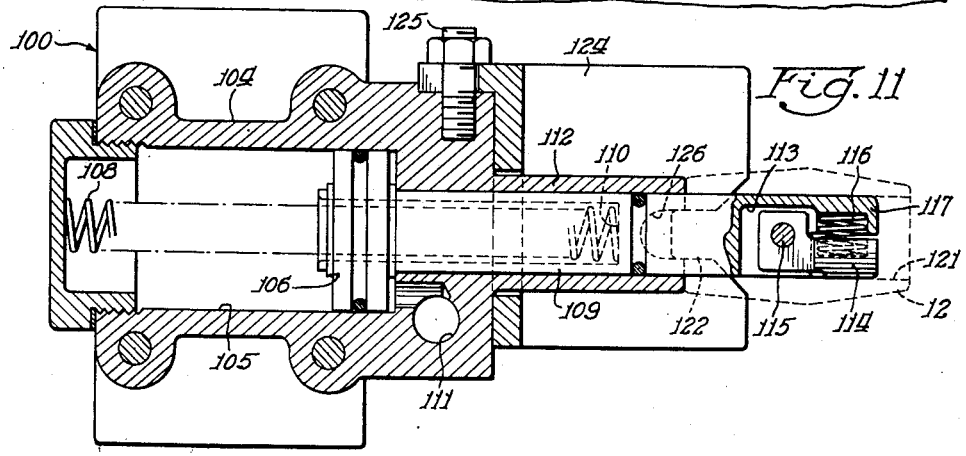

April 7, 1953  R. J. PETERS ET AL  2,634,121
APPARATUS FOR HANDLING AND SURFACE-HARDENING ARTICLES
Filed Dec. 15, 1948  12 Sheets-Sheet 5

Inventors:
Robert J. Peters
John R. Guenther and
Joseph W. Pollard
By: Edward C. Fitzhugh
Atty

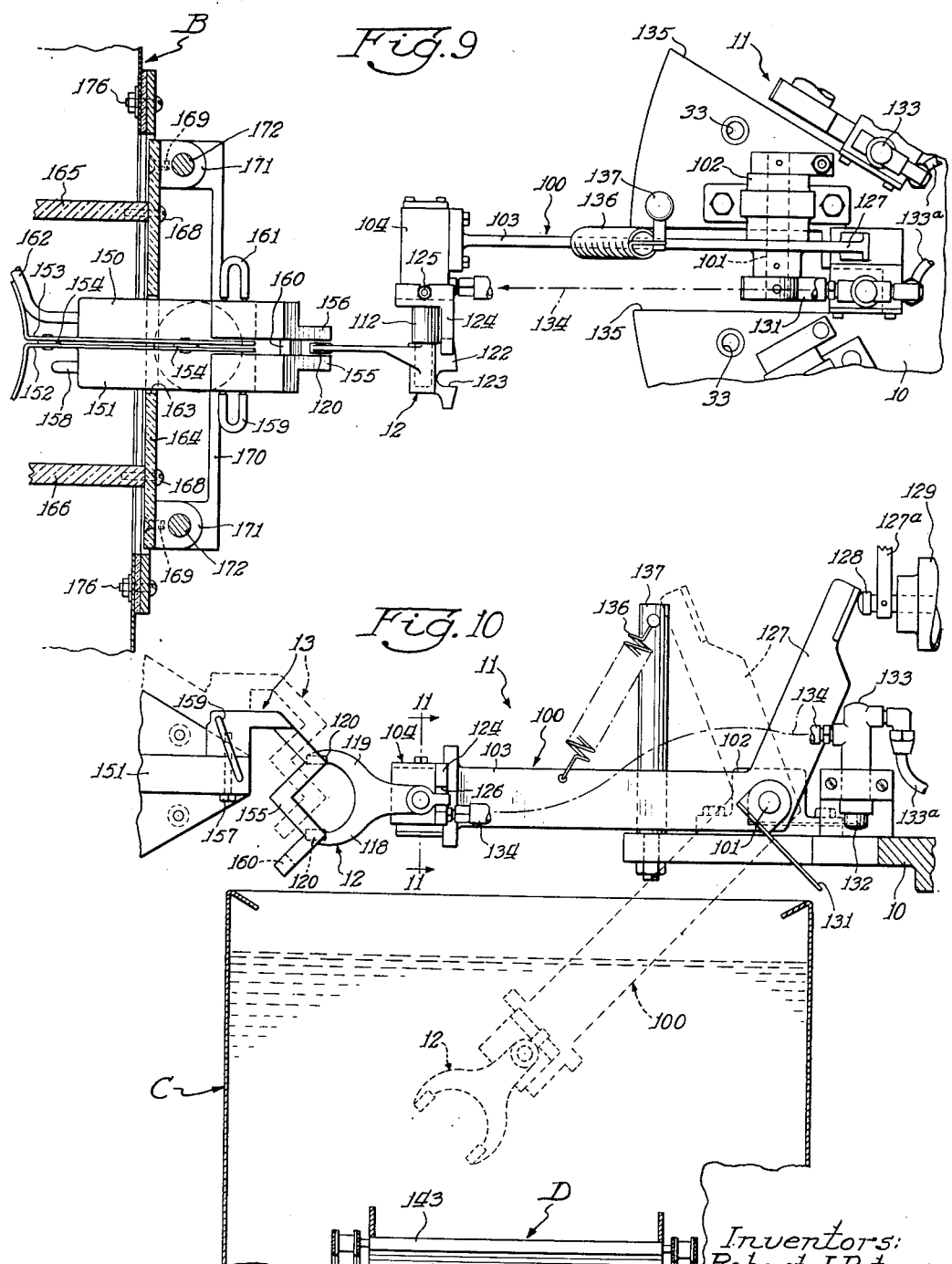

April 7, 1953     R. J. PETERS ET AL     2,634,121
APPARATUS FOR HANDLING AND SURFACE-HARDENING ARTICLES
Filed Dec. 15, 1948     12 Sheets-Sheet 7
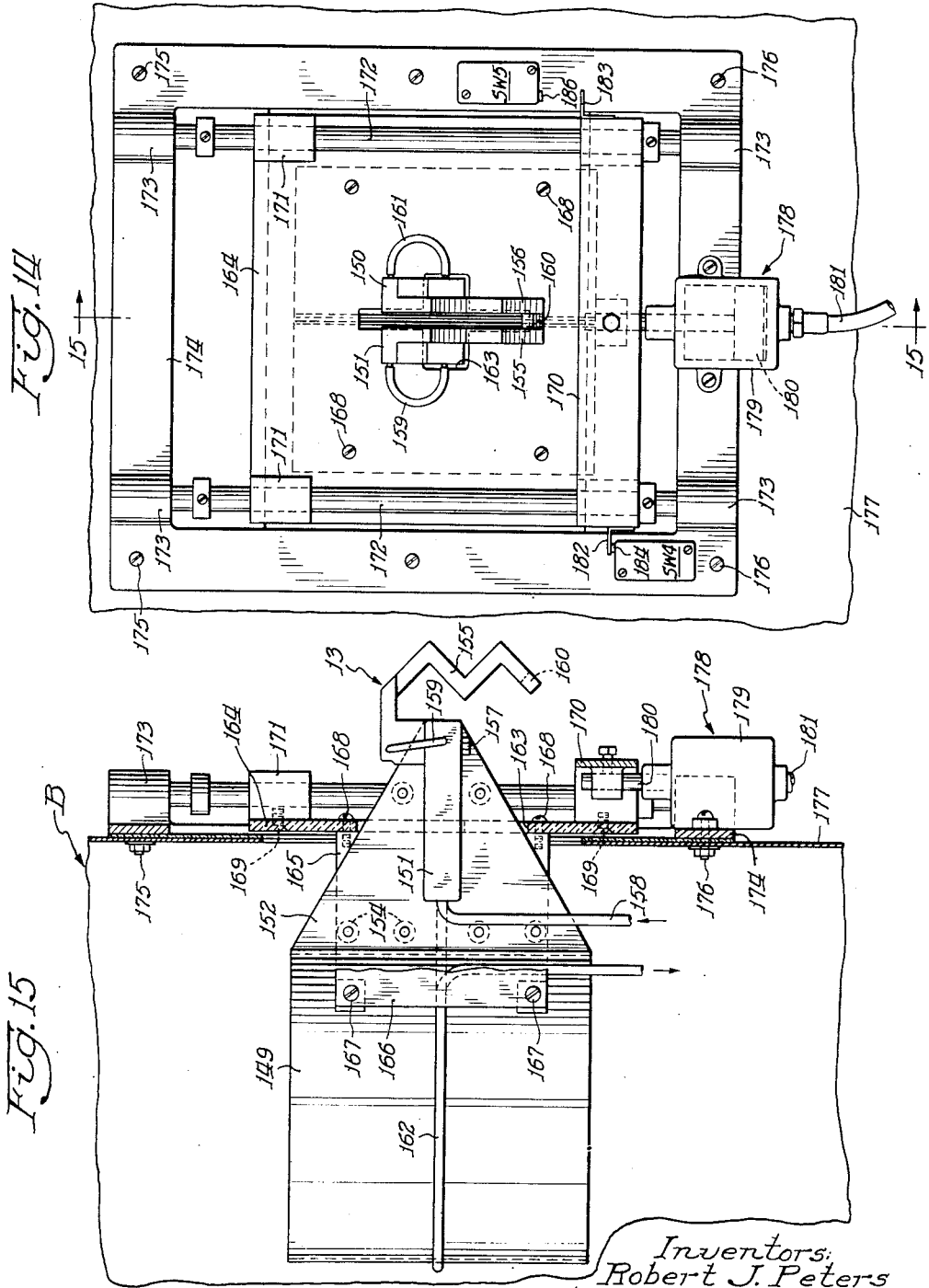
Inventors:
Robert J. Peters
John R. Guenther and
Joseph W. Pollard
By Edward C. Fitzhaugh
Atty April 7, 1953 R. J. PETERS ET AL 2,634,121
APPARATUS FOR HANDLING AND SURFACE-HARDENING ARTICLES
Filed Dec. 15, 1948 12 Sheets-Sheet 8
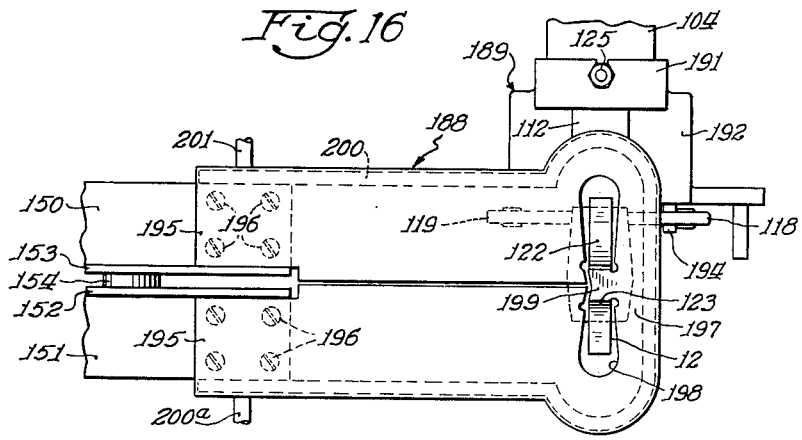
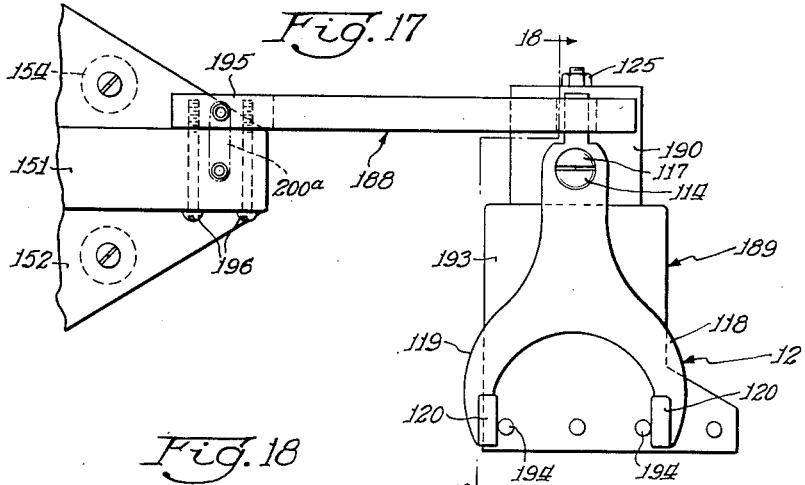
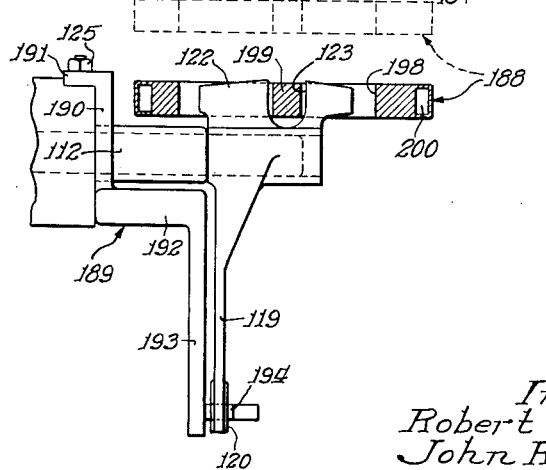
Inventors:
Robert J. Peters
John R. Guenther and
Joseph W. Pollard

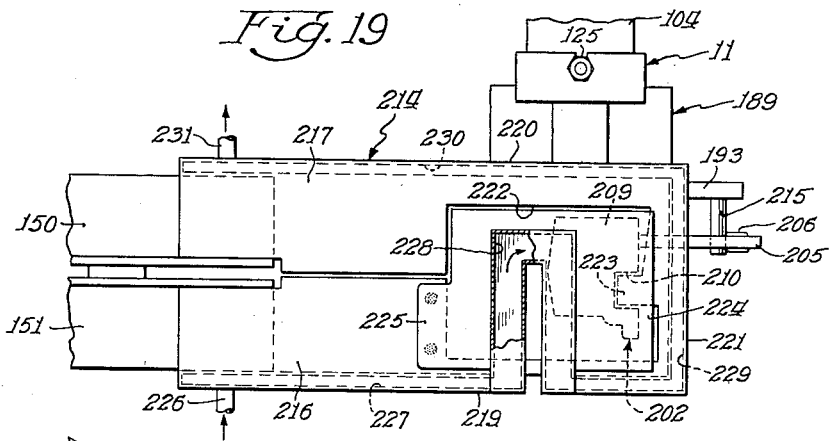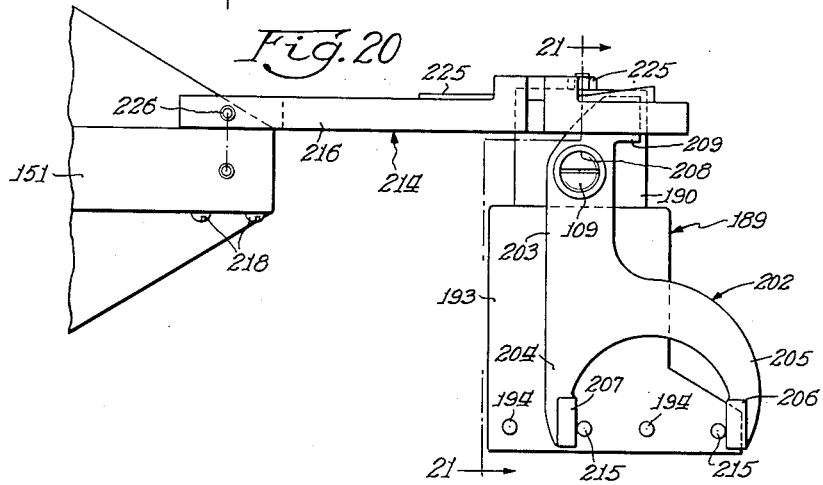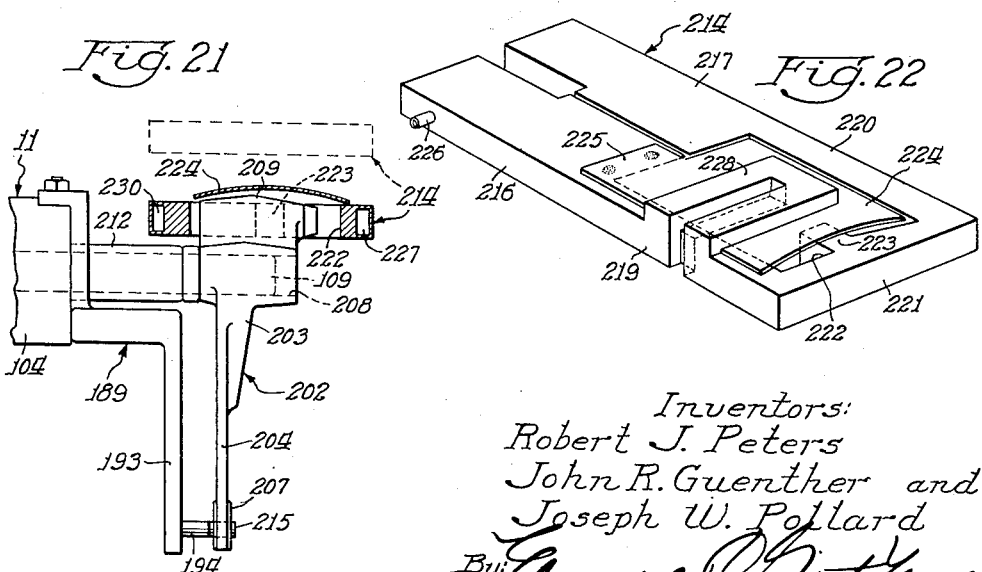

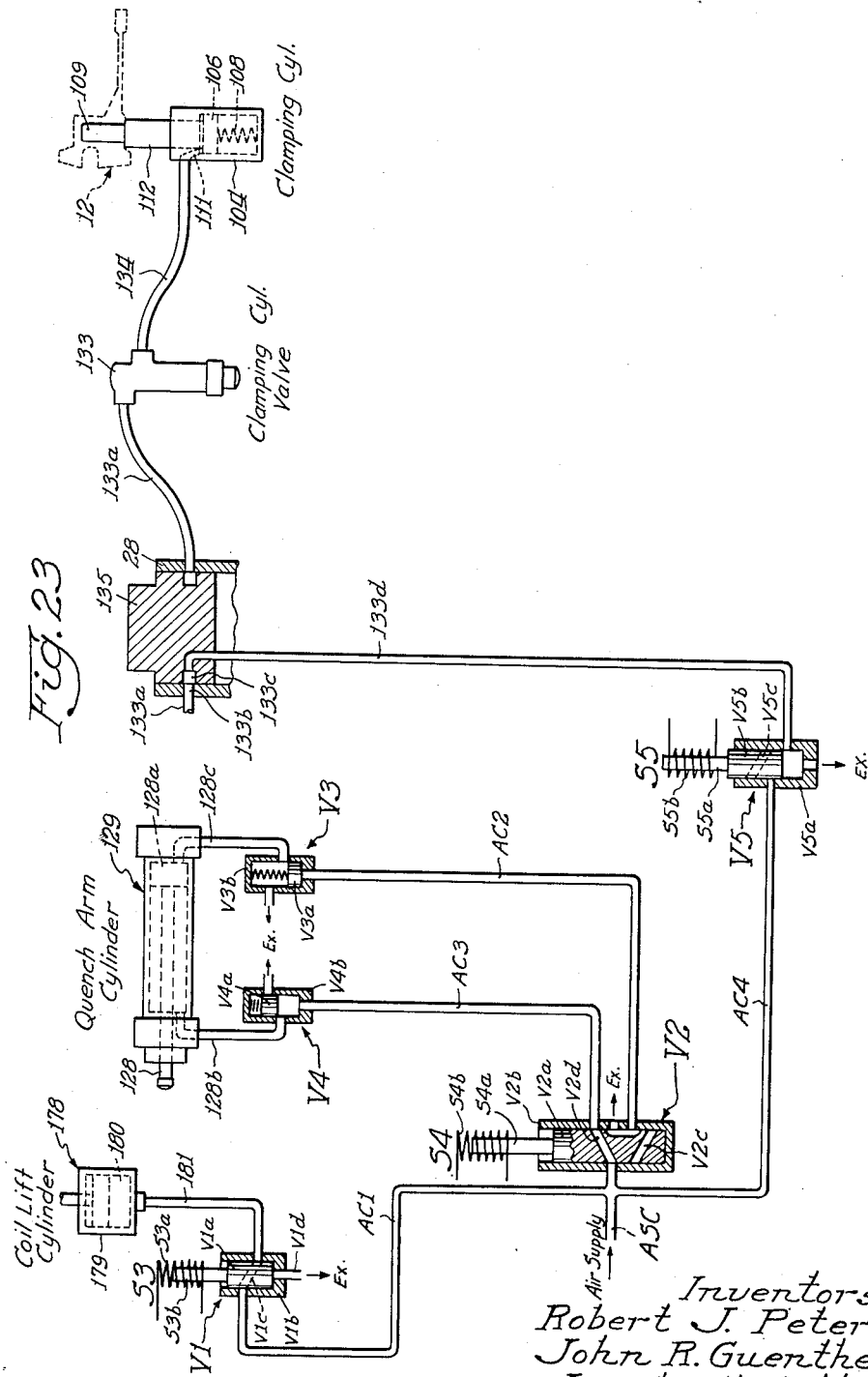

April 7, 1953  R. J. PETERS ET AL  2,634,121
APPARATUS FOR HANDLING AND SURFACE-HARDENING ARTICLES
Filed Dec. 15, 1948  12 Sheets-Sheet 11
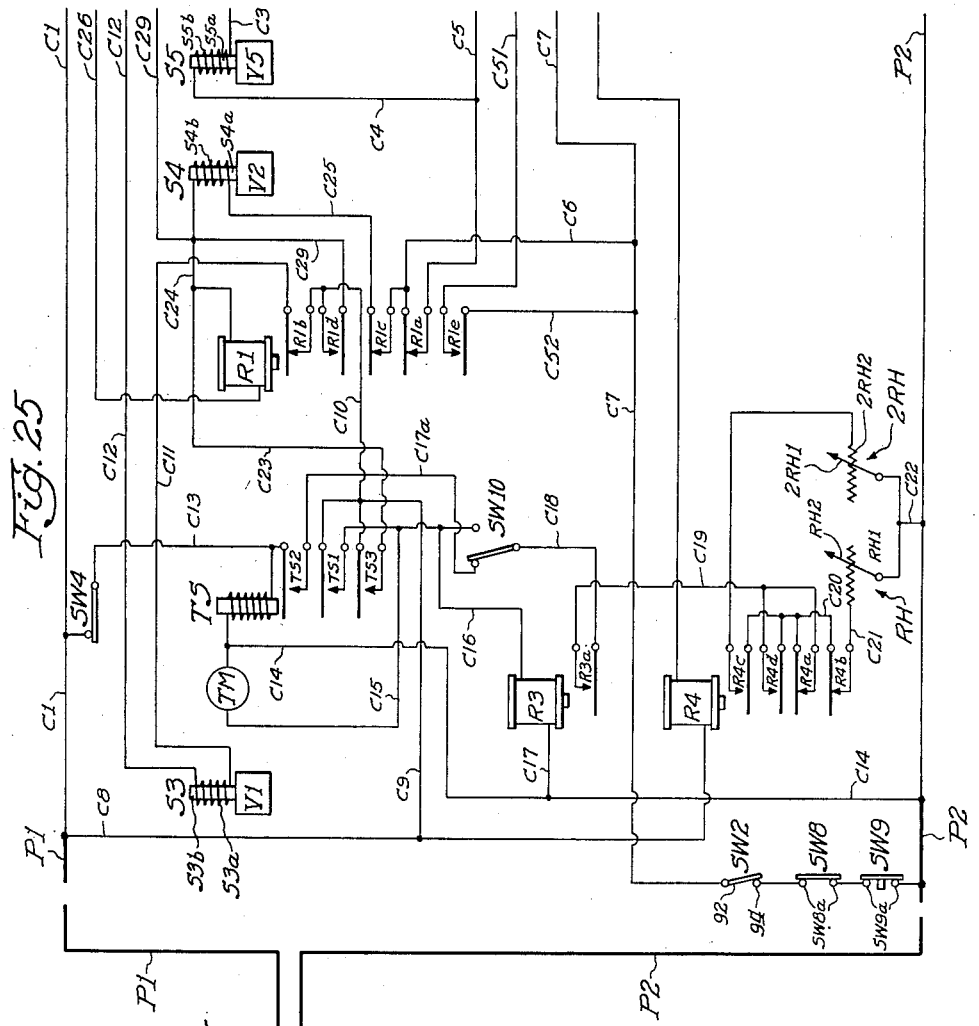
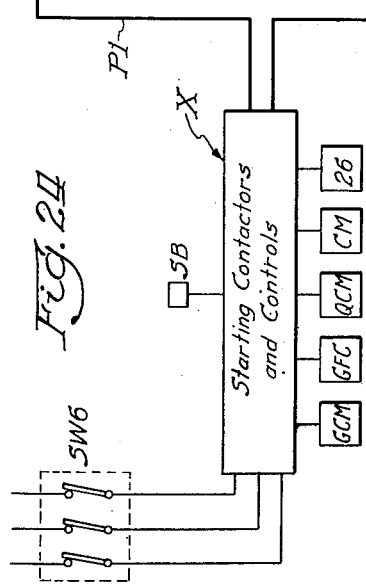
Inventors:
Robert J. Peters
John R. Guenther and
Joseph W. Pollard
By Edward P. Fitzhugh
Atty.

April 7, 1953  R. J. PETERS ET AL  2,634,121
APPARATUS FOR HANDLING AND SURFACE-HARDENING ARTICLES
Filed Dec. 15, 1948  12 Sheets-Sheet 12
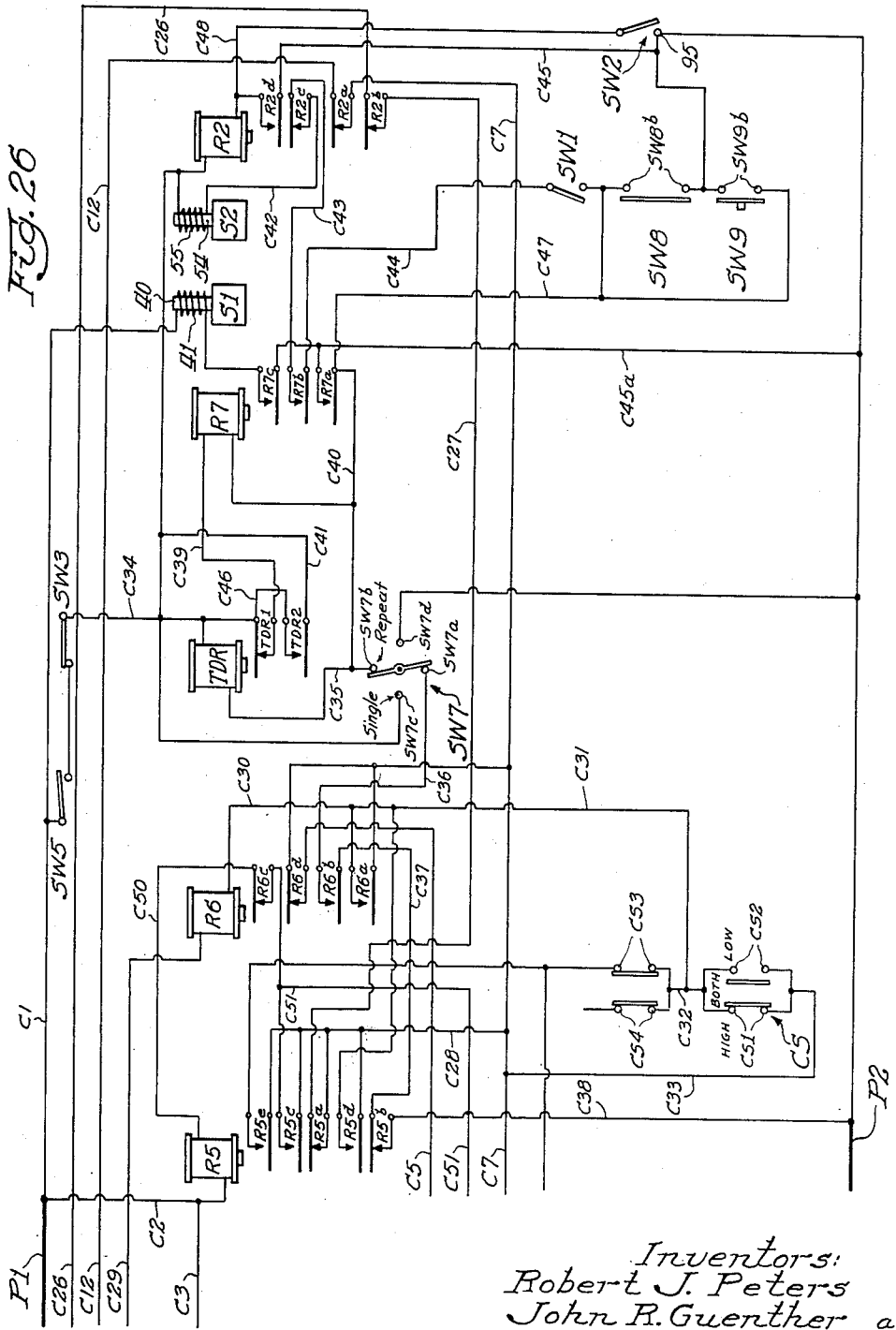
Inventors:
Robert J. Peters
John R. Guenther and
Joseph W. Pollard
By Edward C. Gritzbaugh
Atty.

Patented Apr. 7, 1953

2,634,121

UNITED STATES PATENT OFFICE 2,634,121

APPARATUS FOR HANDLING AND SURFACE-HARDENING ARTICLES

Robert J. Peters, Muncie, Ind., and John R. Guenther and Joseph W. Pollard, Chicago, Ill., assignors to Borg-Warner Corporation, Chicago, Ill., a corporation of Illinois Application December 15, 1948, Serial No. 65,486

9 Claims. (Cl. 266—4)

1

This invention relates to a method and apparatus for handling and surface-hardening articles.

An object of the invention is to provide a method and apparatus for supporting a plurality of articles to be surface-hardened, progressively moving the articles into inductive heat-treating relation to an inductive heating device of the apparatus, inductively heat-treating surfaces of the articles, and quenching the heat-treated surfaces of the articles to complete hardening of these surfaces of the articles.

Another object of the invention is to provide a method and apparatus for handling and supporting a plurality of articles to be hardened, inductively heat-treating the articles, and quenching the articles, in an automatic cycle of operations.

Another object of the invention is the provision of mechanical handling and work-supporting equipment for articles to be surface-hardened, adapted to successively present the articles to induction heating coils for heat treating certain surfaces of the articles, and immerse the heat-treated articles into a quenching bath.

A further object of the invention is to provide an apparatus for mechanically handling a plurality of articles to be hardened and adapted to cooperate with heating and quenching units to successively move the articles into heat-treating and quenching relation therewith.

Still another object of the invention is to provide a method and apparatus for handling and surface-hardening articles which is automatic in operation, and wherein a plurality of articles to be hardened are circularly arranged and successively moved into proximity of an inductor coil for heat treating and then deposited in a quenching bath to complete the hardening operation; the aforesaid actions being performed in a predetermined fully automatic sequence of operations and in a continuous manner.

Another object of the invention is to provide an apparatus for mechanically handling and supporting a plurality of articles to be hardened in combination with an induction heating equipment, the mechanism comprising an indexing device with controls associated therewith and the induction heating equipment to automatically effect the presentation of the articles successively to an inductor coil of the induction heating equipment for heat-treating, to effect movement of the inductor coil into heating relation with each article to be heat-treated for a predetermined period of time, and immersing each heat-treated article into a quenching bath at the conclusion of the heating period therefor.

2

Another object of the invention is to provide a control system for the apparatus described and operative to control the automatic cycle of operations of the apparatus to effect heating of an article at one temperature, quenching the article, reheating the article at another temperature, and then quenching the article.

A further object of the invention is to provide, in an automatic control system for apparatus, such as described, wherein controls are embodied for preselecting the amount of inductive-heating current the generator of the inductive-heating device of the apparatus supplies to the article being heat-treated.

A further object of the invention is to provide a method and apparatus for heat-treating spaced projecting portions of an article and, upon removal of the article from the inductor coil, to effect simultaneous quenching of the spaced heat-treated portions of the article to obtain uniform hardness and to avoid distortion or twisting of the spaced heat-treated portions of the article. The method and apparatus are of particular advantage in uniformly hardening spaced projecting portions of an article, such as a shift fork of a transmission control system, which fork must have its tines in the same plane for reception in the shift collar of the transmission control system, the ends of the tines being subject to wear during shifting of the transmission from one speed ratio to another speed ratio.

The invention also contemplates improvements in inductive heating coils for use with induction heating equipment.

Other objects and advantages inherent in our improvements in method and apparatus for handling and hardening articles will become apparent from the following description in the specification taken with the drawings, in which:

Fig. 1 is a side elevation of the combined work-handling and surface-hardening apparatus of our invention;

Fig. 2 is a top plan view of the apparatus shown in Fig. 1;

Fig. 3 is a sectional view of the work-handling structure in Figs. 1 and 2, said section being taken along the line 3—3 of Fig. 1;

Fig. 4 is a view, partly in section, of the drive mechanism of the work-handling structure, said section being taken along the line 4—4 of Fig. 3;

Fig. 7 is a sectional view of a portion of the control mechanism, the section being taken along the line 7—7 of Fig. 3;

Fig. 8 is a side view of the portion of the control mechanism shown in Fig. 7, the view being taken along the line 8—8 of Fig. 3, certain parts being broken away to more clearly illustrate the construction;

Fig. 9 is a top view of the inductor coil of the induction heating equipment and mechanism for moving the same, and also one of the article-holding devices, of the work-handling structure, the inductor coil-moving mechanism being shown in section, said section being taken along the line 9—9 of Fig. 3;

Fig. 10 is a side elevation of the inductor coil and the article-handling device shown in Fig. 9, together with the quenching tank of the hardening equipment;

Fig. 11 is a section taken through the article-handling device shown in Figs. 9 and 10, the sections being taken along the line 11—11 of Fig. 10;

Fig. 12 is a fragmentary view of the induction coil, and the article-handling device, shown in Fig. 10, to illustrate the adaptability of the apparatus in handling and heat-treating an article of different conformation than that shown in Fig. 10;

Fig. 13 is a view taken along the line 13—13 of Fig. 12;

Fig. 14 is a front elevation of a portion of the induction heating equipment and illustrates details of the inductor coil and mechanism for moving the same, said view being taken along the line 14—14 of Fig. 2;

Fig. 15 is a section taken along the line 15—15 of Fig. 14;

Figure 5:
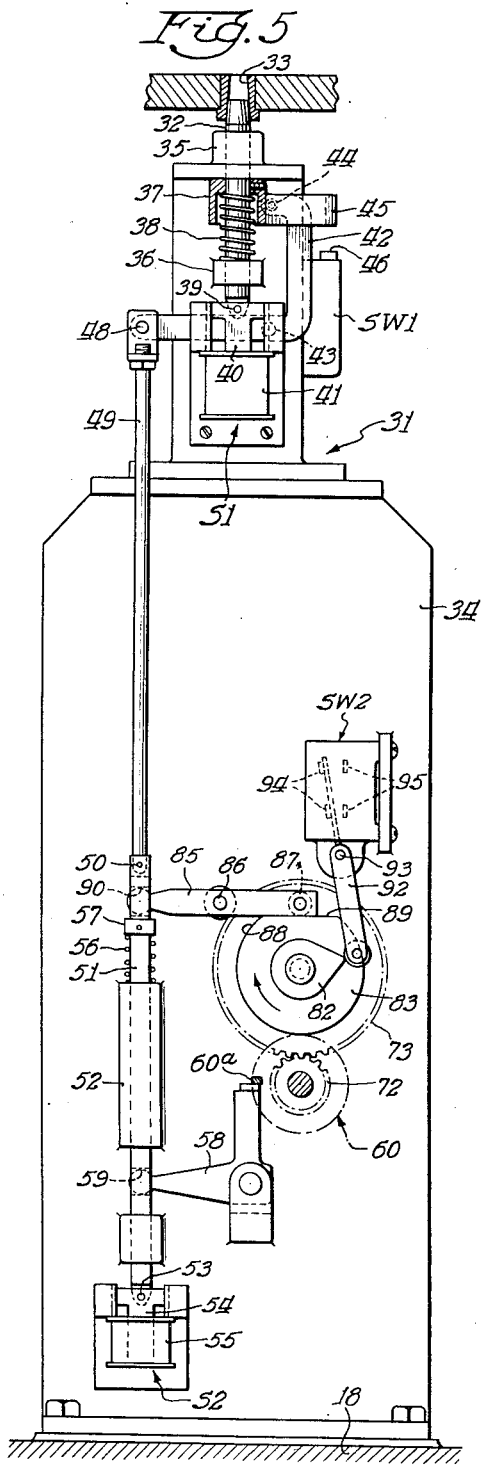
Figs. 5 and 6 are side elevations of control mechanism, including indexing means, of the work-handling structure, these views being taken along the line 5—5 of Fig. 3, Fig. 5 illustrating the mechanism in operative position, and Fig. 6 illustrating the mechanism in inoperative position.

Figs. 16, 17 and 18 are views illustrating another type of inductor coil for heat-treating a different portion of the article to be hardened as well as an adaptor for use with the article-holding device of Figs. 9 and 10 and capable of positioning the selected portion of the article to be hardened in proximity to the inductor coil, Fig. 16 being a top plan view, Fig. 17 being a side elevation, and Fig. 18 being a view taken along the line 18—18 of Fig. 17 and showing the inductor coil in section to more clearly illustrate the arrangement;

Figs. 19, 20, 21 and 22 illustrate still another type of inductor coil for heat-treating a different portion of the article to be hardened shown in Figs. 12 and 13, the coil being shown in heat-treating relation to the article supported by the article-holding device, Fig. 19 being a top view of the inductor coil and article-holding device, Fig. 20 being a side view thereof, Fig. 21 being a view taken along the line 21—21 of Fig. 20 with the inductor coil being shown in section, and Fig. 22 is a perspective view of the inductor coil;

Fig. 23 is a diagrammatic view of the pneumatic or pressure air system for actuating various instrumentalities of the apparatus, the view also illustrating electrical devices for controlling the valves of the system; and Figs. 24, 25 and 26 are schematic views, taken as a whole, illustrating the electrical controls instrumental in effecting automatic operation of our apparatus.

The embodiment of the invention illustrated in the drawings may be considered with respect to its principal components by referring to Figs. 1 and 2, in which a work-handling structure is indicated generally at A; an induction heating equipment indicated at B; a quenching tank at C for heat-treating and quenching articles to be hardened; and a conveyor mechanism D for removing the hardened articles from the tank C. These components of our improved apparatus have various controls associated therewith which are effective, as hereinafter will be more specifically pointed out, to provide an automatic sequence of operations, wherein the work or article-handling structure A is operative to move articles to be hardened step by step into heat-treating relation with an inductor coil of the induction heating equipment B, and thereafter the heat-treated article is immersed by the work-handling structure A into the quenching tank C to complete the hardening operation, the work-handling equipment being particularly adapted for use in the practice of an improved quenching method hereinafter described, in which spaced projecting portions of the article to be hardened, such as the ends of the tines of a shift fork, are simultaneously placed in contact with the quenching fluid in the quenching tank by the work-handling equipment, to instantaneously effect cooling by quenching of the two heat-treated portions of the article to obtain uniform surface-hardening of the article and the avoidance of twisting or distortion of the spaced portions of the article during quenching. The cycle of operations described may be repeated continuously, if desired.

Considering now more specifically the various components of our improved apparatus and referring first to the structure or mechanism A for presenting the articles to be hardened successively to the inductive heating equipment for heat-treating, the article-handling structure A comprises a rotatable turntable 10, on which is mounted a plurality of devices, indicated at 11, for holding articles to be hardened, such as shift forks 12, rotation of the turntable 10 causing the devices 11 to be successively brought adjacent to an inductor coil 13 of the induction heat-treating equipment B to position the shift forks in heat-treating relation thereto and thereafter moving each heat-treated article into the quenching fluid in the tank C. The turntable 10, on which the work-handling devices 11 are mounted, is an annular member and is adapted to be rotated by a cylindrical hub or sleeve 14 formed integral therewith centrally thereof. The lower extremity of the sleeve 14 is formed to provide a gear 15 having teeth meshing with a worm 16 (Fig. 4) having its opposite ends mounted on bearings, supported in spaced walls of a casing 17, connected to a stationary base 18 (Fig. 3), the one end of the worm 16 extending outwardly of the casing and through the hub of a gear 19. The gear 19 meshes with a gear 20 mounted at one end of the shaft 21, the other end of the shaft extending within a speed reducer generally indicated at 22, the speed reducer having a pulley 23 driven by a belt 24 associated with a pulley 25 fixed to the shaft of an electric motor 26. The shaft 21 is suitably journaled at spaced points thereof in sleeve bearings in supports 27 fixed to the base 18, as shown in Fig. 3. A clutch 60, hereinafter described, is utilized to provide a driving connection between the gear 19 and worm 16. It will be apparent that, upon energization of the motor 26 and engagement of the clutch 60, the arrangement described will be effective to rotate the turntable 10.

The turntable, including the hub 14, is supported at its upper end by means of a collar 28 bolted thereto, the collar 28 being rotatably mounted on roller bearing 29, 29 supported on a cylindrical column 30 disposed within the sleeve 14 and formed integrally with the base 18.

Figure 6:
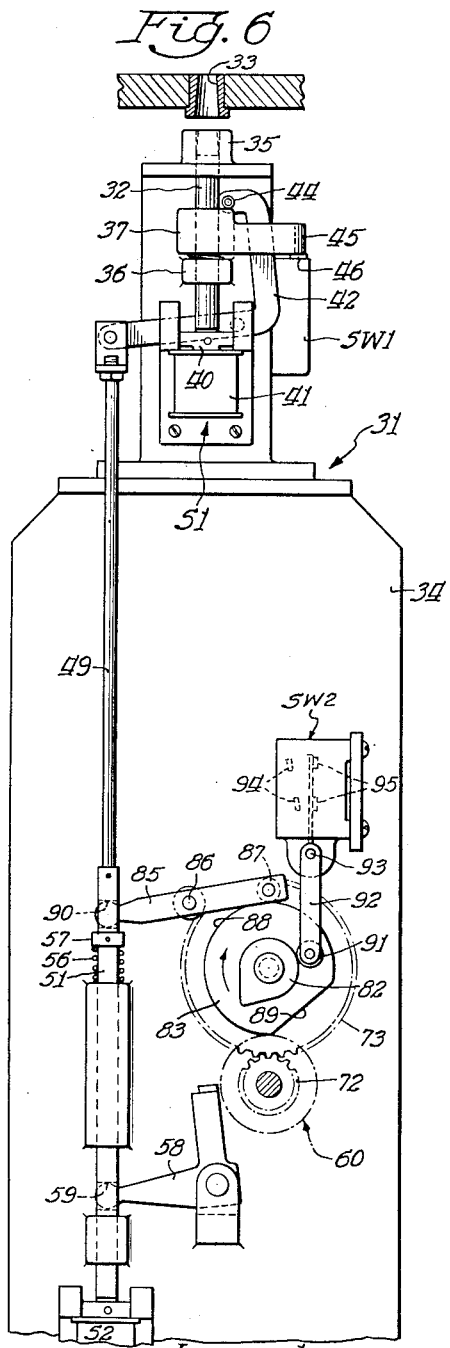

Control mechanism generally indicated at 31 and shown in Figs. 1, 3, 5 and 6 is operative to control the rotation of the turntable and is effective to prevent rotation of the turntable for a predetermined period of time after rotation of the turntable to bring one of the shift forks into heat-treating relation with the inductor coil 13 and thereafter to permit rotation of the turntable to position another of the shift forks for heat-treating by the coil 13. The control mechanism includes indexing mechanism for performing this function. The indexing mechanism comprises pin 32 receivable within any one of a plurality of openings 33 in the turntable 10, there being an opening 33 in the turntable adjacent each of the work holders 11. When the pin 32 is received within one of the openings 33, as shown in Figs. 3, 5 and 6, the work holder device 11 on the diametrically opposite side of the turntable will dispose the shift fork 12 held thereby in a position to permit heat-treating of the same by the inductor coil 13.

It is desirable that each of the shift forks be positioned in induction-heating relation to the coil 13 for a predetermined period of time, and the indexing pin 32 is controlled to be periodically inserted in the successive openings 33 to prevent rotation of the turntable for the period of time required for inductively heating each of the shift forks 12, as they are sequentially brought into the vicinity of the coil 13. For this purpose, the indexing mechanism further comprises a standard 34 fixed to the base 18 and provided at its upper end with hollow bosses 35 and 36 slidably receiving the indexing pin 32. The pin 32 has a collar 37 secured thereto by means of a screw, as shown in Fig. 5, said collar 37 engaging the upper end of a spring 38 seated at its lower end against the boss 36 and operative to urge the pin 32 upwardly into the aligned opening 33 in the turntable 10. The lower end of the pin 32 is fixed at 39 to an armature 40 of a solenoid S1 received within a coil 41 of the solenoid S1 so that energization of the coil 41 will cause the armature 40 to to be moved downwardly, and thereby remove the pin 32 from the opening 33, as shown in Figs. 5 and 6. The pin 32 may be held in its downward position, as shown in Fig. 6, by means of an L-shaped lever 42 pivoted as at 43 to the standard 34 and having a roller 44 at its upper end adapted to ride over and engage the top of the collar 37 when the other extremity of the lever 42 is moved downwardly.

It may be noted that the collar 37, fixed to the pin 32, has a lateral extension 45 engageable with a push button 46 actuating contacts in a switch SW1, when the pin 32 and thereby the collar 37 are moved to and from the turntable 10. The purpose of this arrangement will become evident as the description progresses.

The extremity of the lever 42, remote from the roller 44, is pivoted at 48 to a shaft 49 connected by a pin 50 to a rod 51 movably mounted in a sleeve 52 fixed to the standard 34. The lower extremity of the rod 51 is secured as at 53 to an armature 54 of a solenoid S2 disposed in a coil 55 of the solenoid, so that, upon energization of the coil 55, movement of the armature 54, rod 51, and shaft 49 will cause the lever 42 to rotate about its pivot 43 to effect engagement of the roller 44 with the top of the collar 37, as shown in Fig. 6, to hold the collar 37 and thereby the pin 32 in its downward position, the solenoid S1 being energized at this time. It will be apparent that, upon the energization of the solenoids S1 and S2, the lever linkage described will be effective to position the roller 44 to hold and maintain the collar 37 and thereby the index pin 32 in its downward position and out of the adjacent opening 33 in the turntable 10. Thus, should the solenoid S1 be accidentally deenergized during rotation of the turntable, the lever and roller mechanism will be operative to prevent engagement of the pin with the turntable 10, thereby providing an effective safety feature. Surrounding the rod 51 is a spring 56 having its lower end seated against the top of the sleeve 52 and its upper end engaging a collar 57 fixed to the rod 51 for a purpose to be described. It may be noted that, when both the coils 41 and 55 are deenergized during machine operation, the spring 38 may become effective, through the lever linkage, to release the roller 44 from the collar fixed to the pin, and the spring 38 then can operate to move the index pin 32 into an opening 33.

Further control mechanism is provided for controlling movement of the pin 32 and the turntable 10 in sequential order during the cycles of operation, and this mechanism comprises a bell crank lever 58 pivotally mounted on the standard 34 and having the extremity of one arm thereof disposed within an opening 59 extending transversely of the rod 51, the end of the other arm of the lever engaging a stop 60a on the clutch 60, said clutch being of the single revolution type disclosed in U. S. Patent No. 2,140,737. The clutch 60 is operative to automatically engage and disengage the driving power to the turntable 10 transmitted to the driving gear 19 and the motor 26 at the same point of rotation of the gear 19 for each operating cycle of the apparatus A. In this case, each cycle may be considered to be the distance from one of the openings 33 to the next adjacent opening 33 in a counterclockwise direction as viewed in Fig. 2 during rotation of the turntable 10. The construction and operation of this clutch are well known to those in the art, are described in the aforesaid patent, and, therefore, will be only briefly described.

Referring to Figs. 7 and 8, the gear 19 has its hub 61 keyed to a collar 62 rotatably mounted on the shaft end 63 of the worm gear 16. The collar 62 has an outer driving sleeve or shell 64 connected to a radially extending flange 65 integral with the collar 62. The clutch also comprises an inner driven hub 66 which carries tripping mechanism 67. A series of rollers 68 is held in position between the sleeve 64 and the hub 66 in a cage 69. The rollers furnish a driving contact between a hardened steel race on the sleeve 64 and a hardened steel cam 70 on the inner hub 66, and the rollers are moved into and out of driving contact by action of the cage 69 which is controlled by the trip cam 71.

The hub 66 which carries the trip mechanism is keyed to the shaft 63 which is effective, upon rotation, to rotate the worm 16 and gear 15 to rotate the turntable, and this hub 66 is intermittently driven. The one end of the shaft 63 is provided with a gear 72 meshing with a gear 73. The crank lever 58 has the end of the vertically extending portion thereof rideable on the cam surface 74 of the cam 71, which cam is effective to trip the clutch upon the end of the lever 58 contacting the step or stop 60a on the cam 70. At this time, the driven shaft 63 will continue to rotate approximately 5 degrees but not more than 15 degrees to release the clutch. During this period, the trip cam 71 swings on a pivot pin 76, moving the trip block 77 to rotate the cage 69 with respect to the hub 66 and force the clutch rollers out of driving contact. The clutch remains in the released position as long as the lever 58 is in contact with the trip cam step 60a. When the lever is withdrawn, a spring 80, having one end fixed to the cam 71 and its other end to the hub plate 77, will snap the trip cam 71 into driving position and the clutch will pick up the load without any slip or lag. The clutch will continue to drive as long as the trip lever is held out of contact with the cam step 60a, and this can be one, two, or any number of complete revolutions of the shaft 63 drivingly connected to the turntable 10. It will thus be apparent that the clutch mechanism is operative, upon engagement of the lever 58 with the cam stop 60a, to prevent drive being transmitted from the gear 19 to the shaft 63 and that, upon release of the lever 58 with the cam stop 60a, the clutch mechanism will be effective to transmit rotary movement from the gear 19 to the shaft 63 to effect movement of the turntable 10, the distance between two of the openings disposed adjacent each other in a counter-clockwise direction, and that, upon rotation of the turntable such distance, the lever 58 will engage the cam stop 60a to effect release of the clutch and thereby disconnect the drive from gear 19 to the shaft 63.

Considering the arrangement of the intermittent operation of the driving mechanism just described in connection with the safety mechanism, including the lever linkage between the lever 58 and the pin-locking roller 44, it may be noted that the cam stop 60a is engaged by the lever 58 to release the clutch and thereby the driving connection between the gear 19 and the shaft 63, when the index pin 32 is positioned in the opening 33 in the turntable 10, as shown in Fig. 5, the solenoid S1 being deenergized at this time to permit the pin 32 to be inserted in the opening 33 by the action of the spring 38. Referring to Fig. 6, it may be noted that the pin 32 is withdrawn from the opening 33 and that at this time, the lever 58 is not engaged with the cam stop 60a so that the clutch will be engaged to effect rotation of the turntable at this time. The lever 58 further being effectually prevented from engagement with the cam stop due to engagement of one extremity thereof with the opening 59 in rod 51 which is momentarily held at this time in downward position by the energized solenoid S1. At this time, the energized solenoid S1 is effective to move the armature 40 and thereby the pin 32 downward and to remove the pin 32 from the opening 33 in the turntable, and as the downward movement of the rod 51 by the solenoid S1 is transmitted to the lever 42 by the shaft 49 to position the roller 44 in engagement with the collar 37, the pin 32 will be maintained in its lower position in the event of accidental deenergization of the solenoid S1.

As previously described, the gear 72 meshes with a gear 73. The latter gear is rotatably mounted on the standard 34 and has cams 82 and 83 at one side thereof and integral therewith. A lever 85 is pivotally mounted intermediate its ends at 86 to the standard 34 and has at one end thereof a roller 87 riding on the periphery 88 of the cam 83, said periphery having a dwell 89 comprising a flat surface engageable with the roller 87 upon rotation of the cam 83 by the gear 73 when the clutch 60 is engaged and the turntable rotates. The spring 56 urges the rod 51 upwards at all times, and the rod will exert force on the lever 85 to maintain the roller 87 in contact with the periphery of the cam 83. The opposite end of the lever 85 extends within an opening 90 in the push rod 51 so that during rotation of the cam 83, the lever 85 will vertically move the rod 51 by movement of the lever caused by the engagement of the roller with the periphery of the cam 83. It may be noted from a consideration of Fig. 5 that, when the lever 58 engages the trip stop 60a of the clutch 60 to release the clutch, the clutch will be ineffective to transmit drive from the gear 19 to the shaft 63 to rotate the turntable or the gears 72 and 73, and the roller 87 will be engaged with the dwell 89 on the cam 83. At this time, the pin 32 is received within the opening 33 in the table to prevent rotation of the table during heating of a shift fork 12 by the coil 13. However, when the solenoid S1 is energized to withdraw the pin from the turntable and the clutch is engaged to rotate the turntable, the gear 73 will be rotated to effect rotation of the cam 83 in a clockwise direction and, accordingly, the roller 87 will engage the arcuate periphery 88 of the cam 83 to cause the lever 85 to pivot in a counter-clockwise direction to urge the rod 51 and shaft 49 downward against the action of the spring 56 and thereby cause the lever 42 to rotate and engage the roller 44 with the top of the collar 37 fixed to the pin 32 to maintain the pin 32 in its released position, thus providing positive mechanical means for maintaining the pin 32 in its downward position in the event the solenoid S1 should be accidentally deenergized. However, it may be noted that, after rotation of the turntable the distance from one opening 33 to the next adjacent opening 33, the lever 58 will engage the trip stop 60a of the clutch 60 to effect release of the clutch and disengagement of the driving connection between the gear 19 and the driven shaft 63, and that, at such time, the roller 87 will engage the dwell 89 of the cam 83 to permit the rod 51 and the shaft 49 to be actuated upwardly by the spring 56 and thereby rotate the lever 42 about its pivot 43 to release the roller 44 from the collar 37, whereby the spring 38 may become effective to push the index pin 32 upward into the opening 33.

During rotation of the gear 73, the cam 82 on the gear 73 engages a roller 91 at one end of a lever 92 pivoted intermediate its ends at 93, the lever having its upper electricity-conducting arm engageable with contacts 94 and 95 of a switch SW2 forming a portion of the electrical control system hereinafter described. It may be noted that in the arrangement disclosed in Fig. 5, wherein the clutch 60 is disengaged and the index pin 32 is positioned within an opening 33 in the turntable 10, the gear 73 and thereby the cam 82 have been rotated so that the high point of the cam 82 is in contact with the roller 91 to break the engagement of the lever with the contacts 95 and to engage the lever with contacts 94. When the clutch 60 is engaged and the pin 32 is withdrawn from the opening 33, as shown in Fig. 6, the roller 91 engages the arcuate surface of the cam 82, and the lever 92 will rotate and be disengaged from the contacts 94 and engage the contacts 95, for a purpose to be described.

Referring now to Figs. 3, 9, 10 and 11, each of the work-holding devices 11 of the work-handling equipment is identical, and for this reason, it is believed that a detailed description of only one of them is necessary for the purpose of disclosure. It is believed that a detailed description of the two devices shown in Fig. 3 at opposite sides of the turntable 10 and including reference to the enlarged views (Figs. 9, 10 and 11) of one of the devices will be sufficient to provide an adequate disclosure. Referring to Figs. 3, 9 and 10, the device 11 comprises a lever 100 pivotally mounted on pin 101 fixed to spaced-supporting brackets 102 on the turntable 10 of the work-handling apparatus, the lever 100 having a horizontally extending arm 103 to which is connected a mechanism 104 for holding and releasing a shift fork 12. The mechanism 104 comprises a hollow casing (Fig. 11) providing a piston chamber 105 receiving a piston 106 having a piston rod 109 connected thereto. A cap is threaded into one end of the casing 104 to seal the open end of the chamber and has one end of a spring 108 seated thereagainst, the opposite end of the spring extending through the piston 106 and being received within the tubular piston rod 109 and abutting the wall 110 of said rod to normally maintain the piston in the position shown in Fig. 11. The casing is provided with a passage 111 for air under pressure and communicates with the chamber 105 in the casing 104 to urge the piston 106 toward the left against the action of the spring 108. The piston rod 109 is slidably mounted in a hollow extension 112 of the casing 104 and extends outwardly thereof. The outer extremity of the piston rod 109 is formed with a recess 113 for receiving a spring-actuated member 114 pivoted as at 115 to the rod 109 for downward movement by a spring 116 positioned and confined between the member 114 and the end 117 of the rod 109.

It may be noted from an inspection of Figs. 9, 10 and 11 that the shift fork 12 is mounted upon the outwardly extending extremity of the piston rod 109. The fork comprises a Y-shaped member having spaced tines 118 and 119, with the extremities of the tines being thickened as shown in Fig. 9, these thickened ends being designated as 120 and being adapted, upon assembly with a transmission control system, to engage a shift collar or gear for moving the shift collar or gear to institute or release a change speed condition of the transmission. The ends 120 thus normally are subjected to wear, and it is desirable that these ends of the fork be hardened to withstand wear.

The fork 12 is normally fixed to a shift rail, and, for this purpose, is provided with an opening 121 therethrough for fitting the fork on the conventional shift rail or shaft of the transmission control arrangement. The top of the fork is provided with an upstanding flange 122 having a recess 123 formed therein for receiving a shift lever conventionally employed by the operator of the vehicle to permit the manual selection or release of a speed ratio change of the transmission. The end of the shift lever is movable in the recess 123 of the flange 122 of the shift fork so that the portion of the flange 122, defining the recess 123, is subjected to friction and consequent wear by the shift lever. It is, therefore, desirable to harden the surfaces of the flange 122, defining the recess 123, to resist such wear.

In Figs. 3, 9 and 10, the shift fork is held by the mechanism 104 of the device 11 for hardening the enlarged extremities 120 of the tines 118 and 119 of the shift fork 12 by positioning the extremity of the tubular piston rod 109 within the opening 121 in the shift fork, the compressive effort of the spring 116 causing the member 114 to securely hold the shift fork 12 on the rod 109. To prevent the shift fork 12 from rotating, an angle member 124 (Fig. 11) is bolted at 125 to the casing of the mechanism 104, with the member 124 seated against the casing, as shown, and the member 124 is provided with a slot 126 receiving the flange 122 on the shift fork 12 (Figs. 9 and 10). Due to the yieldability of the spring 116, the shift fork may be readily mounted upon the rod 109 by manual effort and can be removed therefrom, upon the admission of air under pressure to the passage 111 which will force the piston 106 and thereby the rod 109 to the left as viewed in Fig. 11, and, as the shift fork abuts against the tubular extension 112 of the casing, the shift fork 12 will be released from the holding device 11.

The lever 100 has an arm 127 extending upwardly at an angle to the arm 103 thereof, and the extremity of the arm 127 abuts against a piston rod 128 connected to a piston 128a of a pneumatic device 129 so that, after heat-treating of the shift fork 12 adjacent the coil 13, the admission of air through a tube 128c to device 129 will cause the piston 128a to move outwardly of the device 129 to move the lever 100 in a counterclockwise direction to plunge the heat-treated shift fork 12 into the quenching fluid in the tank C. At such time, a plate 131, fixed to the lever 100 at its pivotal connection 101 to the turntable 10, will engage the extremity of a movable valve body 132 of a valve 133 to open the valve 133 to permit air under pressure to pass through a conduit 134 to the passage 111 in the casing, whereupon the piston 106 will be actuated to effect release of the shift fork from the holding device 11. The valve 133 is connected to a conduit 133a which communicates with an opening 133b in the collar 28 fixed to and rotatable with the turntable 10. All of the openings 133b communicate with an annular groove or passage 133c of a hub member fixed to the upper end of the stationary column 30, and the groove 133c communicates with a pipe 133d extending downwardly in the stationary hollow column 30 and through an opening at the lower end thereof and connected to the supply of air under pressure. Thus, it will be apparent that, as the collar 28 has a plurality of openings 133b, one associated with each valve 133, the piston 106 of each of the work-holding devices 11 can only be operated by air under pressure to eject the associated fork 12 therefrom when the lever 100 of the device 11, in proximity to the coil 13, is operated by the pneumatic device 129 to rotate the lever and thereby cause the plate 131 to engage and move the valve body 132 of the associated valve 133 to place the air under pressure in communication with the piston and cylinder mechanism 104 of the device 11. It will thus be evident that each heat-treated shift fork 12 is released from the mechanism 104 of the associated holding device 11 only after the shift fork 12 is immersed in the quenching fluid in the tank C, when the plate 131 on the lever 100 will contact and move the valve body 132 of the valve 133 to admit air pressure to the mechanism 104 of the device 11.

It may be noted from a consideration of Figs. 3, 9 and 10 that the turntable 10 is provided with slots 135 therein at the respective devices 11 to permit passage of the arms 103 of the levers 100 through the table to plunge the heat-treated forks 12 into the tank C. To return each lever 100 to its normal position, the air under pressure in the pneumatic device 129 is exhausted through a conduit 128c and a spring 136 having one end attached to the lever arm 103 and its other end attached to a post 137 fixed to the turntable 10, will operate to raise the arm 103.

Forcibly immersing the inductively-heated fork 12 in the quenching liquid is of considerable advantage in obtaining the uniform hardening of the heat-treated surfaces of the shift fork 12. Ordinary quenching, in which an inductively-heated fork is simply dropped or falls by gravity into the quenching liquid, not only causes soft spots in the heat-treated surfaces thereof but distorts the fork inasmuch as the quenching liquid, contacting the heated fork, will form bubbles adhering to the heat-treated surfaces, with the result that the bubbles act as an insulating medium preventing the quenching liquid engaging and thereby properly cooling the surfaces to provide uniform hardening of the surfaces of the fork. It has also been observed that, where two spaced parts of an object, such as the tines of the shift fork, are heat-treated and simply dropped into the quenching liquid, the bubbles adhere to some portions of the heat-treated spaced parts or tines, while the quenching liquid contacts other heat-treated portions of the same whereby the liquid-engaged portions of each of the spaced portions of the article or tines of the forks are cooled more rapidly than the portions thereof having the bubbles formed thereon, with the result that uneven cooling is had of the heat-treated parts or tines which causes distortion and twisting of the parts or tines. This undesirable feature is avoided by the present method of quenching of the heat-treated article or shift fork due to the rapid motion of the shift fork 12 through the quenching medium by the arm 103 of the lever 100 which is operative, upon actuation by the piston rod 128 of the pneumatic device 129, to sweep the shift fork through the quenching liquid in the tank C.

More specifically, bubbles are formed on the entry of the heat-treated fork 12 into the quench bath and will adhere to the surfaces of the fork. The lever arm 103 sweeping the fork through the quenching fluid causes these bubbles to be swept away from the surfaces of the fork, and the quenching fluid can reach the fork to provide a uniform quenching of the surfaces. The arm is actuated by pressure rather than gravity and causes the fork to enter the quenching fluid much faster than it would if the arm were moved by gravity. It will be apparent that the movements of the fork in air, and water or other liquid, due only to gravity, is considerably different, whereas in forcibly immersing the fork as described, movement of the fork is substantially constant in air and in any liquid-quenching medium. Thus, movement of the fork only by gravity will not sweep away the bubbles, adhering to the fork, but the forcible immersion of the fork as described will sweep away these bubbles to permit the quenching liquid to reach the surfaces of the fork and uniformly cool the same. The elimination of the bubbles is very desirable, as the bubbles form an insulation between the quenching liquid and the heat-treated surfaces or portions of the fork, causing these surfaces or portions to be cooled at a much slower rate than the heat-treated surfaces or portions contacting the liquid itself and, as a result, the variations in cooling of the portions or surfaces having the bubbles insulating the same from the liquid and the liquid-engaged surfaces of the fork will cause distortion and twisting of the fork, and thereby this method and apparatus is of particular advantage in uniformly cooling heat-treated surfaces of articles.

As will be apparent from an inspection of Fig. 3, the pneumatic device 129 is mounted on a bracket 138 bolted to and supporting the cover 139 for the work-handling apparatus A, the bracket 138 being fixedly supported on the top of the stationary column 30, as shown. As seen in Figs. 1, 2 and 3, the cover 139 has a depending flange having an opening 140 at the left-hand end thereof to permit the operator to mount the shift forks on the exposed work-holding devices 11, and an opening 141 is also provided in the cover 139 adjacent the induction heating equipment indicated at B to permit the shift forks to be disposed in heat-treating relation to the coil 13 of the induction heating equipment B. Secured to and movable with the piston rod 128 of the pneumatic device 129 is an arm 127a for operating a push button 142 actuating contacts of a switch SW3, fixed to the cover 139, for a purpose to be described.

As previously described, upon completion of heating the fork 12 at the heat-treating station by the inductor coil 13, the heat-treated fork is plunged into the quenching liquid in the tank C and thereafter the shift fork is released from the associated holding device 11 by the operation of the piston 106 of the device 11. The shift fork 12 is then carried upward by a belt 143 of a conveyor system D in the tank C and deposited on a slide 144 for movement toward and reception on a table 145. The belt 143 is mounted upon rollers having associated sprocket pulleys 146 and 147 connected by chains, as shown in Figs. 1 and 2, and the pulley 147 may be continuously driven by means of an electric motor (not shown).

Referring now to the induction heating equipment designated generally at B and shown in Figs. 9, 10, 15 and 16, this equipment comprises a conventional high frequency generator including a transformer having conventional primary and secondary links, with the primary link connected to a suitable source of periodically varying current and inducing voltage and currents at radial frequency in the one-turn secondary or output link 149 (Figs. 9 and 15). The current is carried to the inductor coil 13 and a large magnetic current is induced within the work coil. This is accomplished by spaced electrodes 150, 151 receiving therebetween and secured to the parallel end walls 152 and 153 of the cylindrical secondary link 149. A plurality of insulating washers 154 are disposed between the walls 152 and 153 to prevent the passage of current from one electrode to the other. Each of the electrodes 150 and 151 are hollow for permitting the flow of cooling fluid therethrough. The inductor heating equipment described is of conventional design and is well known to those skilled in the art; accordingly, it is believed a brief description thereof will suffice for purpose of disclosure.

As shown in Figs. 9, 14 and 15, electrodes 150 and 151 have mounted thereon the inductor coil 13, which comprises a pair of spaced copper conductors 155 and 156 connected by a copper tube 160 and fastened to respective electrodes by bolts 157, the coil 13 being movable in a vertical direction as hereinafter described. Each of the conductors 155 and 156 are of a wavy or undulate formation, and the ends 120, 120 of the tines 118 and 119 may be disposed between the conductors with each of the tine ends received between the adjacent outer crests of the waves of the conductors for inductive-heating when the conductors are in their lower position as seen in Fig. 1 movement of the coil 13 upwardly will dispose the conductors 155 and 156, out of inductive heating relation with the tine ends, as the tine ends will be positioned in the valleys between the crests of the waves of the conductors. To cool the electrodes 150 and 151 and the conductors 155 and 156, cooling fluid is adapted to enter the conduit 158 and flow through the hollow electrode 151, tube 159 communicating with the interior of the hollow conductor 155, and tube 60 connecting the conductors 155 and 156 providing a passage between the hollow interiors thereof, and thence through the conductor 156 to a tube 161 connected to the interior of the electrode 150, the fluid then passing from the electrode 150 to a tube 162 surrounding the secondary link 149.

The induction-heating equipment is provided with mechanism for raising and lowering the secondary link and thereby the inductor coil 13 into and out of heating relation with the ends 120, 120 of the shaft fork 12 positioned adjacent the coil 13 by its associated device 11. For this purpose, the electrodes 150 and 151 are respectively received within and extend through an opening 163 in a plate 164, and inasmuch as the walls 152 and 153 of the secondary link 149 are secured to the electrodes 150 and 151, respectively, spaced plates 165 and 166 of an insulating material may be secured to the cylindrical portion of the link 149 as at 167, as shown in Fig. 15, and each of these plates have one end thereof abutting against and secured to the plate 164 of non-conducting material as shown at 168 (Figs. 9, 14 and 15).

The plate 164 is secured by screws 169 to a crossbar 170 and hollow bosses 171 slidably receiving shafts 172 disposed at opposite sides of the plate 164. The opposite ends of the shafts 172 are received within and fixed to hollow bosses 173 of a rectangular frame 174 secured by bolt and nut assemblies 175 and 176 to the front wall 177 of the generator casing. Referring to Figs. 14 and 15, a pneumatic device 178 comprises a cylinder 179 mounted on the frame 174 and front wall 177 of the casing and a movable piston 180 fixed to the crossbar 170 connected to plate 164 supporting the electrodes, as shown in Figs. 14 and 15, the pneumatic device 178 being centrally disposed between the bottom ends of the frame 174 fixed to the front wall of the generator casing.

A conduit 181 is connected to the cylinder 179 of the device 178 for providing air under pressure to the cylinder to move the piston and thereby the plate 164 upwardly. As a result, the plate 164, the plates 165 and 166, the secondary link 149, the electrodes 150 and 151 and inductor coil 13 will be moved upwardly to position the coil 13 out of heating relation with the ends of the tines 118 and 119 of the fork 12. The air under pressure is released from the cylinder 179 through the conduit 181, whereupon the weight of the induction-heating structure and the means for slidably mounting the same therefor on the rails or shafts 172 will cause the inductor coil 13 to move downwardly into heating relationship with the shift fork 12. It may be noted from a consideration of Fig. 14 that the sides of the crossbar 170 have secured thereto outwardly extending arms 182 and 183, the arm 182 engaging a button 184 of switch SW4 when the crossbar 170 and plate 164 is in their lower position and the coil 13 is in heating relation to the fork, and the arm 183 engaging a button 186 of a switch SW5 when the plate 164 is in its raised position and the coil 13 is removed from the fork 12. The purpose of this switch arrangement will become apparent as the description proceeds.

Referring to Fig. 23, the pneumatic or pressure air system there shown includes valves for controlling the operation of the pneumatic assembly 178 for raising or lifting the inductor coil of the induction heating equipment out of heat-treating relation with the heat-treated fork, the pneumatic assembly 129 operating the lever 100 of each fork-clamping and releasing device to plunge the heat-treated fork into the quenching fluid in the tank C, and the pneumatic assembly 104 of the device 11 to release the fork in the quenching fluid in the tank C.

More particularly, a source of air under pressure communicates with the air supply conduit ASC and flows through conduits AC1 and AC4 and can flow through either of the conduits AC2 and AC3 by operating the valve V2. The air flows through the conduit AC1 to a valve V1 having a movable valve element V1a in a cylinder V1b having its passage V1c in communication with the conduits AC1 and 181, the air flowing through the conduit 181 to actuate the piston 180 of the pneumatic assembly 178 to raise the inductor coil out of heating relation to a heat-treated fork. A solenoid S3 has a coil S3a receiving an armature S3b connected to the valve element V1a so that, upon energization of the coil, the armature will raise the valve element to permit the air in the assembly 178 and conduit 181 to be exhausted through the exhaust port V1d and to prevent the flow of air through the valve element to the assembly 178, whereby the inductor coil will move downwardly by gravity into heating relation with a shift fork.

Air also flows through the conduit ASC to a valve V2 having a movable valve body V2a in a cylinder V2b, the valve body V2a being moved upwardly by an armature S4a of a solenoid S4 upon energization of its associated coil S4b, whereby the passage V2c in the body V2a connects the conduits ASC and AC2 to permit the flow of air through the conduit AC2 to the valve V3 to raise the movable valve body V3a in the valve cylinder V3b upwardly against the action of the spring in said cylinder for admitting air into the conduit 128c and to the piston 128a of the pneumatic assembly 129. The piston 128a and rod 128 will move to the left to actuate the lever 100 to plunge the heat-treated shift fork into the quench bath. To move the piston 128a and rod 128 to the right to their normal positions, the solenoid S4 is deenergized and the valve body V2a will move downwardly under the influence of gravity, to connect its passage V2d with the conduits ASC and AC3, whereupon air under pressure will flow through the conduit AC3 to raise the valve body V4a against the action of the spring in the cylinder V4b to permit the air to flow through the conduit 128b into the assembly 129 forcing the piston 128a and rod 128 toward the right, the lever 100 of the device 11 thereupon being returned to its normal raised position by the spring 136. It may be noted that, upon the flow of air being cut off to either the valve V3 or V4, the air in the conduit from the valve V2 to the valve will flow through the conduit to the exhaust port in the cylinder V2a of the valve V2 and the associated valve body will be moved downwardly by its spring, whereupon the air in the cylinder of the assembly 129 will be exhausted through the conduit from the assembly to the valve upon movement of the piston 128a toward the end of the assembly connected to this conduit.

The pneumatic assembly 104 of each fork-clamping and releasing device 11 is also connectible to the conduit ASC. Air under pressure flows from the conduit ASC through conduit AC4 to the cylinder V5a and movable valve element V5b of the valve V5. The valve element V5b is connected to the armature S5a within a coil S5b of a solenoid S5, which, when energized, will cause the valve element V5b to move upwardly whereby the passage V5c in the element will connect the conduits AC4 and 133d to permit the flow of air through the conduit 133d to the annular passage 133c in the stationary hub member and one of the circumferentially-spaced openings 133b in collar 28 rotating with the turntable 10 and devices 11. As previously described, upon positioning of each fork-clamping and releasing device adjacent the inductor coil and actuation of the outwardly projecting valve body 132 of the valve 133 by the plate 131 on the lever 100 at the limit of its downward movement to immerse the heat-treated fork in the quenching fluid in the tank C, the opening of the valve 133 will permit air to flow therethrough and the conduit 134 into the cylinder of the pneumatic mechanism 104 of the device 11, whereupon the piston 106 and rod 109 will be moved to release the fork from the rod 109. Upon deenergization of the solenoid S5, the valve element V5b of the valve V5 will move downwardly by gravity to prevent passage of air through the valve and to allow the air under pressure in the passage 133d to flow through the exhaust port in the cylinder V5a in the valve V5, the piston 106 and rod 109 of the assembly 104 being actuated by the spring 108 to move the rod 109 outwardly for mounting another shift fork thereon.

Figs. 16 to 18, inclusive, illustrate an inductor coil 188 for heat treating the surface defining the recess 123 in the flange of the shift fork 12, and also a fixture 189 for positioning the fork 12 on the device 11 in heating-induction relation to the inductor coil 188. Referring to the fork-holding device 11 shown in Fig. 11, the angle member 124 can be removed therefrom by removing the bolt 125, and the fixture 189 may be mounted on the casing of the device 11 by positioning the same thereon, as shown in Fig. 18, and replacing the bolt 125 to securely maintain the fixture 189 on the casing. As shown in Figs. 16, 17 and 18, the fixture 189 comprises a vertical wall 190 seated against the end of the casing and having a laterally-extending flange 191 secured to the top of the casing by bolt 125. The wall 190 has an opening therein for receiving the tubular extension 112 of the casing, and the wall 190 merges at its lower end with a wall 192 underlying the tubular extension 112 of the casing. The wall 192 merges with a downwardly extending plate 193 having studs 194 extending laterally therefrom at the bottom thereof adapted to engage the inner facing sides of the ends 120, 120 of the fork 12 to prevent rotation of the fork and to position the fork in heating relation with the inductor coil 188 now to be described.

The conductors 155 and 156 forming the inductor coil 13 are detachably mounted upon the electrodes 150 and 151 and can be removed by detaching the bolts 157 securing the same to the electrodes 150 and 151. The coil 188 may then be mounted on and attached to the electrodes.

The inductor coil 188 is a horseshoe-like plate, with the extremities of the legs 195, 195 being secured to the electrodes 150 and 151 by bolts 196 as shown in Figs. 16 and 17. The portion 197 connecting the legs 195, 195 is provided with an opening 198 receiving the upstanding flange 122 of the shift fork 12, and a projection 199 extends from the connecting portion 197 into the recess 123 of the shift fork 12, with the extremity of the projection being disposed in close proximity to the surface defining the recess in the fork 12 and also to the adjacent extremities of the legs 195, 195 so that a large flux will be produced for heating the surface defining the recess 123 in the fork. The inductor coil 188 is formed with a continuous passage 200 in the legs 195, 195 and connecting portion 197 thereof, and this passage extends entirely around the outer periphery of the coil for conducting quenching fluid through the coil introduced into the coil through the tube 200a and passing from the coil through a tube 201.

Referring to Fig. 18, it will be noted that, when the inductor coil 188 is mounted upon the electrodes 150 and 151 as described, it may be moved in a vertical direction to bring the coil in heat-treating relation with the recess 123 in the shift fork 12, and thereafter the coil may be raised out of heating relation to the fork 12, whereupon the work-holding device 11 will operate to plunge the shift fork into the quenching fluid in the tank C in the same manner described with respect to the hardening of the ends of the shift fork.

Our improved apparatus illustrated in Figs. 1 to 12, 14 and 15 can be utilized to handle and harden another type of shift fork 202 which is shown in Figs. 12, 13, 19, 20 and 21 and is of different configuration than the previously-described shift fork 12. The fork 202 is of H-shape configuration, with the body portion 203 being in vertical alignment with one of the legs 204, the other leg 205 being laterally offset from the body 203 and extending arcuately downward with the thickened end 206 thereof being aligned with the thickened end 207 of the leg 204. The body portion 203 has an opening 208 therein for receiving the piston rod 109 connected to the piston 106 extending outwardly of the tubular sleeve 112 of the cylinder casing for the piston for mounting the fork on the device 11. The other extremity of the shift fork 202 is provided with a head portion 209 laterally offset with respect to the plane of the body portion 203 of the shift fork, as shown in Figs. 12, 13 and 20, and the head portion 209 is provided with a recess 210 for receiving the extremity of a shift lever (not shown) of a transmission control system, and the surface defining the recess 210 in the shift fork is thus subject to wear by the friction encountered upon movement of the end of the shift fork relative thereto in moving the shift fork to and from a speed ratio-changing position thereof. Figs. 12 and 13 show the shift fork 202 positioned on the work-holding device 11, with the ends 206 and 207 of the legs 204 and 205 of the fork positioned between the two conductors 155 and 156 forming the inductor coil 13 for heat treating the ends. A fixture 211 is provided for maintaining the fork 202 in this position and to prevent rotation of the shift fork. The fixture 211 is substantially identical to that previously described as fixture 124 (Fig. 11) but differs therefrom by having a recess 212 in one of the walls thereof for receiving the head portion 209 of the fork 202, a spring clip 213 being secured within the recess to the member 211 and operative to engage the head portion 209 to resist rotary movement thereof and thereby to maintain it in the position shown in Figs. 12 and 13.

To heat treat the surface defining the recess 210 in the head 209 of the fork 202, the fixture 189 shown in Figs. 16, 17 and 18 and previously described is utilized to position the fork 202 in heat-treating relation to an inductor coil 214. Referring to Figs. 19, 20 and 21, it may be noted that a pair of studs 215 are provided on the fixture for engaging the inner facing sides of the ends 206 and 207 of the legs 204 and 205 of the fork 202 to maintain the fork in an upright position and to prevent rotation of the shift fork on the piston rod 109 connected to the piston of the work-holding device 11. The inductor coil 214 is provided for heat treating the surface defining the recess 210 in the shift fork. The coil 214 comprises a horseshoe-shaped plate, with the ends of the legs 216, 217 thereof being mounted on and secured as at 218 to the electrodes 150 and 151, as shown in Fig. 20. It may be noted from a consideration of Figs. 19 and 22 that the legs are positioned closely adjacent each other and are of substantial width, the legs having reduced upper portions 219, 220 joined by a connecting portion 221. The reduced portions 219 and 220 and the connecting portion 221 define, with the upper extremities of the thickened portions of the legs, a rectangular opening 222 receiving the head portion 209 of the fork 202. The connecting portion 221 of the inductor coil is provided with a projection 223 extending into the opening 222 of the coil and disposed within the recess 210 in the shift fork. Positioned over the opening 222 in the coil is a rectangular plate 224, arcuate in cross section, substantially covering the opening 222 in the coil. The plate 224 has a tab portion 225 riveted to the leg 216 of the coil. The plate 224 is utilized as a shield for current direction and concentration. It will be apparent, upon the application of current to the inductor coil, that the surface defining the recess 210 in the shift fork will be heated by the inductor coil. The coil is provided with a cooling arrangement, and for this purpose, quenching fluid enters into a conduit 226 communicating with a passage 227 formed in the outwardly-disposed peripheral portion of the bottom leg 216 as viewed in Fig. 19, and the fluid is then conducted through a hollow U-shaped tubular portion 228 having the extremities of its legs integral with the reduced portion 219 of the leg 216, shown at the bottom of the coil in Figs. 19 and 20, to conduct fluid from the passage 227 therethrough to a passage 229 in the connecting portion 221 of the coil and thence through a passage 230 in the outer peripheral portion of the leg 217 at the top of Fig. 19 and out of the coil 214 through the conduit 231. The function of the U-shaped portion 228 is to cool the plate or shield 224.

It will be clearly apparent from the foregoing description that the work-handling structure A is capable of holding and feeding different types of shift forks having one or more surfaces to be hardened into heat-treating relation with induction coils specially designed for heat treating desired surfaces of the forks, that the coils may be lowered and raised into and out of heating relation with the forks, and that the heat-treated surfaces of the forks may be immersed in a quenching bath by my apparatus in a manner insuring uniform cooling of these surfaces without distortion or twisting of the tines of the forks.

The fork-handling structure A and induction-heating equipment B may be controlled to provide a continuous automatic cycle of operations, wherein the forks are successively positioned by the turntable 10 in heat-treating relation to the inductor coil, each fork is then heat-treated, quenched, and conveyed to the table 19. If desired, a single automatic cycle of operations may be had in the event one or more forks are to be individually hardened. Also, an automatic cycle of operations may be provided wherein each fork is successively positioned by the turntable 10 in heat-treating relation to the inductor coil, heated at either a high or low temperature by the coil, quenched, then heated again at the other temperature by the coil, and quenched. A feature of the present invention in the performance of these cycles of operations is the control of the amount of heating of the forks by the coil of the induction-heating equipment involving preselection of the amount of power the generator supplies to the work or fork.

An electrical system including a control arrangement is shown in Figs. 24, 25 and 26 and is utilized to effect the operation of motors of the apparatus and to provide the different cycles of operations described above. Referring first to Fig. 24, power is supplied to the electrical apparatus by closing the contacts of the line switch SW6. Power then will flow to the starting contactors and controls, designated generally at X, for the generator filament circuit GFC, the generator coolant motor GCM of the induction-heating equipment B, the quench coolant liquid-supplying motor QCM, the motor CM for the conveyor mechanism D, the motor 26 for rotating the turntable. Upon pressing the start button SB, power will be supplied to the conductors P1 and P2 of the electrical control arrangement for establishing the automatic cycles of operations of the apparatus. The starting contactors and motor controls, designated at X in Fig. 24, are of conventional design and well known to persons skilled in the art, and, therefore, no detailed description of the same appears to be necessary.

To condition the electrical control arrangement to provide a continuous cycle of repeat operations of the apparatus and referring to Figs. 14 and 25, the switch SW7 is rotated to close its contacts SW7a and SW7b and also the contacts SW8a of the switch SW8 are closed. The line switch SW6 is closed to energize the motors and the start button SB is depressed to initiate the repeat cycles of operations of the apparatus. At this time, the inductor coil is in its raised position, as air under pressure flows to the pneumatic device 178 to maintain the coil in this position due to the solenoid S3 being deenergized and the valve body V1a being in its lower position to establish communication between the source of pressure air and the device 178; the turntable is stationary, as the clutch 60 is maintained in its released condition due to the lever 58 engaging the stop 60a of the clutch, the solenoid S2 being deenergized and thereby ineffective to move its armature and the rod 51 downwardly to rotate the lever 59 to disengage the stop to effect engagement of the clutch; the pin 32 is positioned within one of the openings 32 in the turntable by the spring 33, the solenoid S1 being deenergized and thereby ineffective to remove the pin from the opening; air under pressure flows through the valve V2 to the pneumatic device 129 to maintain the piston 129a and rod 128 in their retracted position, whereby the lever 100 of the fork-clamping device 11 is in its normally raised position, solenoid S4 controlling the valve V2 being deenergized; a shift fork is held adjacent the inductor coil by a fork-clamping device 11, as the pneumatic mechanism 104 thereof is inoperative due to the valve body V5b of the valve V5, controlling the flow of pressure air thereto, is pulled upwardly by the armature S5a of the energized solenoid S5 to prevent the flow of air to the mechanism 104. The circuit for energizing the solenoid S5 comprises the conductor P1; conductors C1, C2, C3; the winding S5b of the solenoid S5; conductors C4 and C5; the normally closed contacts R1a of relay R1; conductors C6 and C7; contacts 94 of switch SW2, closed at this time as the arm of lever 92 is on the peaked portion of the cam 82, fixed to the gear 73 driven when the clutch 60 is engaged; closed contacts SW8a of switch SW8; closed contacts SW9a of switch SW9; and the conductor P2.

The automatic repeat cycles of operations of the apparatus will begin by the concurrent establishment of a circuit to energize the solenoid S3 to raise its armature S3b and thereby the valve body V1a upward to prevent the flow of air under pressure to the coil-lift pneumatic device 178 and to effect the exhaust of air in the cylinder 179 thereof, whereby the inductor coil will move downwardly into heating relation with the fork. The circuit for energizing the solenoid S3 comprises the conductor P1; conductors C8, C9, C10; the normally closed contacts R1b of the relay R1; conductor C11; winding S3a of solenoid S3; conductor C12; normally closed contacts R2a of relay R2; conductor C7; closed contacts 94 of switch SW2; closed contacts SW8a of SW8; closed contacts SW9a of SW9; and conductor P2.

When the inductor coil is lowered into heating relation to the fork, the contact of limit switch SW5 will be opened by disengagement of the arm 183, on the inductor coil-supporting frame 170, with the button 186 of the switch. This switch SW5 is in the turntable-indexing circuit for effecting energization of the solenoid S3 for rotating the lever 58 engaging the stop 60a of the clutch 60 to effect a driving connection between the turntable motor and turntable, and this circuit will be later described.

When the inductor coil is in heating relation to the fork, the arm 182 will contact the button 184 of the switch SW4 and the contacts of this switch will be closed to establish a circuit including a timer solenoid TS and a timer motor TM for maintaining the inductor coil in heating relation to the fork for a predetermined period of time. This circuit comprises the conductor P1; conductor C1; closed contacts of switch SW4; conductor C13, the winding of the solenoid TS; conductor C14; and conductor P2. When the timer solenoid TS is energized, contact TS1 is closed. Current will then flow from the conductor P1, through the conductors C8 and C9, closed contacts TS1; conductor C15; the timer motor TM, energizing the motor; conductor C14; to conductor P2. At the same time, current flows through the conductor C15 to the conductor C16; through the winding of the relay R3, conductors C17 and C14; to the conductor P2. Upon energization of the solenoid TS, the contacts TS2 were also closed completing a circuit through conductor P1; limit switch SW4, conductor C13; the closed contacts TS2 of solenoid TS: conductor C17a; the normally closed contacts of switch SW10; conductor C18; closed contacts R3a of energized relay R3; conductor C19; the normally closed contacts R4a of relay R4; conductor C20; the normally closed contacts R4b of relay R4; conductor C21; coil RH1 and movable arm RH2 of power-control rheostat RH; conductor C22; and to the conductor P2. The two sets of contacts TS1 and TS2 of solenoid TS will remain closed for a predetermined period of time required to satisfactorily heat the fork. They will then open and other contacts TS3 will be closed completing a circuit comprising the conductor P1; conductors C8 and and C9; closed contacts TS3; conductors C23 and C24; winding S4b of solenoid S4; conductor C25; the normally closed contacts R1c of relay R1; conductor C6; closed contacts 94 of switch SW2; closed contacts SW8a of switch SW8; closed contacts SW9a of switch SW9; and conductor P2.

Energization of the solenoid S4 will actuate its armature S4a and the valve body V2a of the valve V2 upwardly to permit air under pressure to flow through the valve passage V2c, the conduit AC2, valve V3; to the pneumatic device 129 to urge the piston and piston rod thereof toward the left for rotating the lever 100, mounting the fork-holding device 11, to plunge the heat-treated fork into the quenching liquid in the tank C. As soon as the lever 100 is rotated, the arm 127a on the lever 100 will be disengaged from the button 142 of the limit switch SW3 and the contacts of the switch will open. This will prevent any accidental energizing of the indexing mechanism 31, as this switch is included in the circuit for energizing the solenoid S2 instrumental in controlling engagement of the clutch and rotation of the turntable, as will be later described.

At the same time, the solenoid S4 was energized, the relay R1 was energized through the same circuit energizing the solenoid S4. The circuit for energizing the relay R1 comprises the conductor P1; conductors C8 and C9; closed contacts TS3; conductors C23 and C24; winding of relay R1; conductor C26; normally closed contacts R2b; conductor C27; normally closed contacts R5a of relay R5; conductors C28 and C7; closed contacts 94 of switch SW2; closed contacts SW8a and SW9a of SW8 and SW9; to conductor P2. When the relay R1 is energized, it closes the normally open interlock contacts R1d of the relay R1, which closed contacts jump around the contacts TS3 of the timer solenoid TS which will prevent deenergization of the solenoid S4 and the valve body V2a of the valve V2 will remain in its raised position permitting the flow of air to the pneumatic device 129 to hold the lever 100 in its fork-quenching position. Closing of the contacts R1d will also hold the relay R1 energized. The holding circuit for the relay R1 comprises the conductor P1; conductors C8, C9, and C10; closed contacts R1d of relay R1; conductors C29 and C24; winding of relay R1; conductor C26; closed contacts R2b of relay R2; conductor C27; normally closed contacts R5a of relay R5; conductors C28 and C7; closed contacts 94 of switch SW2; closed contacts SW8a and SW9a of switches SW8 and SW9; conductor P2.

When the relay R1 was energized, the contacts R1b were opened, breaking the circuit energizing solenoid S3, and the armature S3b thereof and valve body V1a will move downwardly to permit air under pressure to flow through the valve V1 into the cylinder 179 of the pneumatic device 178 whereupon the piston 180 will actuate the inductor coil-supporting frame upwardly to remove the inductor coil from the heat-treated fork. Thereafter, the closed contacts TS1 will open after a period of delay determined by the timing solenoid TS and this will break the circuit energizing the solenoid S5. As a result, the armature S5a of the solenoid S5 and the valve body V5b of the valve V5 will move downwardly to permit air under pressure to pass through the open valves V5 and 133 to the pneumatic mechanism 104 of the work-clamping device 11, whereupon the piston 106 and the clamping rod 107 will be moved to release the fork disposed in the quenching liquid in the tank C. Also, when the relay R1 was energized, the closed contacts R1c opened breaking the circuit energizing the solenoid S4, whereupon its armature S4a and the valve body V2a of the valve V2 will move downwardly to permit air to flow through the opening V2d in the valve body and to the front end of the pneumatic device 129 to retract the piston 128a and rod 128 to permit the spring 136 to return the lever 100 of the clamping device 11 to its raised position. The contacts of the switch SW3 are closed by this movement of the piston rod 128. Also, the switch SW5 is closed at this time by the engagement of the push button 195 by the arm 183 of the inductor coil-supporting frame 170 which is now in its raised position. As a result, the following circuits are completed as follows:

Solenoid S5 is energized to raise its armature and thereby the valve body V5b upwardly to prevent the flow of air to the pneumatic mechanism 104 of the clamping device 11. This circuit energizing solenoid S5 comprises the conductor P1; conductors C1, C2, and C3; the winding of solenoid S5; conductors C4 and C5; closed contacts R1a of relay R1; conductors C6 and C7; closed contacts 94 of switch SW2; closed contacts SW8a and SW9a of switches SW8 and SW9; to the conductor P2. At the time the contacts TS3 were closed, current flowed from conductor P1 through conductors C8 and C9; contacts TS3; conductors C23, C24, and C29; the winding of relay R6; conductors C30, C31 and C32; closed contacts CS1 of the control switch CS; conductors C33 and C7; closed contacts 94 of the switch SW2; closed contacts SW8a and SW9a of switches SW8 and SW9; to the conductor P2. Upon energization of the relay R6, the normally open contacts R6a and R6b will be closed and normally closed contacts R6c and R6d will be opened. Opening of the contacts R6c will prevent energization of the relay R5, as normally closed contacts R6c are in the circuit energizing the relay R5. When the contacts R1d of the relay R1 closed, a holding circuit for the relay R6 was established through the conductors C29 and C3 to the conductor P2.

The indexing cycle of the apparatus now begins as current will flow from the conductor P1, through conductor C1; closed contacts of switches SW5 and SW3; conductor C34; the winding of time delay relay TDR; conductor 35; closed contacts SW7b and SW7a of switch SW7 (set for repeat operation); conductor C36; closed contacts R6b of relay R6; conductor C37; closed contacts R5b of relay R5; conductor C38; to conductor P2. Time delay-opening relay TDR is energized and relay R7 is simultaneously energized. The circuit for energizing relay R7 comprises the conductor P1; conductor C1; closed contacts of switches SW5 and SW3; conductor C34; closed contacts TDR1 (which are normally closed for a period of time set by the adjustment of the relay TDR); conductor C39; winding of relay R7; conductors C40 and C35; closed contacts SW7b and SW7a of switch SW7; conductor C36; closed contacts R6b of relay R6; conductors C37; closed contacts R5b of relay R5; conductor C38; to conductor P2. When relay R7 is energized, it closes contacts R7a to establish a locking circuit to hold relays TDR and R7 energized. At the same time, relay R7 closes contacts R7b to establish a circuit from conductor P1, conductor C1; closed contacts of limit switches SW5 and SW3; closed contacts TDR2; conductor C41; winding of solenoid S2; conductor C42; normally closed contacts R2c of relay R2; conductor C43; closed contacts R7b of energized relay R7; conductor C44; closed contacts of switches SW1; conductor C47; closed contacts R7a of relay R7; to the conductor P2. Also, when relay R7 was energized, contacts R7c were closed to establish a circuit energizing the winding 41 of the solenoid S1 and thereby its armature 40 withdrew the index pin 32 from the opening 33 in the turntable 10. This circuit comprises the conductor P1; conductor C1; winding 41 of solenoid S1; closed contacts R7c of relay R7; conductor C45a; to conductor P2.

When the winding of solenoid S2 was energized, the armature 54 thereof pulled down the rod 51 of the indexing mechanism 31 to rotate the lever 58 to disengage the lever from the stop 60a of the clutch 60 which allowed the clutch to engage to effect rotation of the turntable 10 the distance between two adjacent openings. At the same time, the rod 51 actuated the rod 49 to rotate the lever 42 to position the roller 44 thereon in engagement with the collar 37 to retain the pin 32 in its lower position, thus mechanically interlocking the pin from movement upwardly toward the turntable 10. When the clutch 60 engages, the gear 73 and thereby the cam 82 will be rotated causing the switch lever arm 92 of the switch S2 to disengage contacts 94 of the switch and engage contacts 95 of the switch SW2. Opening of contacts 94 will effect deenergization of relays R4, R6 and R1. Closing of contacts 95 will establish a circuit energizing relay R2, closing contacts R2d and opening contacts R2a, R2b and R2c. This circuit comprises the conductor P1; conductor C1; closed contacts of switches SW5 and SW3; conductor C34; conductor C46; closed contacts TDR2 of relay TDR; conductor C41; the winding of relay R2; conductor C48; closed contacts 95 of switch SW2; to conductor P2. Upon the relay R2 being energized, it will close its contacts R2d and establish a holding circuit for the relay R2 which circuit comprises the conductor P1; closed contacts of switches SW5 and SW3; conductors C34 and C46; closed contacts TDR2 of relay TDR; conductor C41; winding of relay R2; closed contacts R2d; conductor C45; to conductor P2. When contacts R2c of relay R2 open, solenoid S2 will be deenergized so that its restraining effect on the lever 58 engageable with the stop 60a of the clutch 60 will be removed. Opening of contacts R2b of relay R2 breaks the circuit energizing solenoid S3 to prevent premature lowering of the inductor coil while the machine is indexing.

When the turntable 10 has rotated substantially the distance between two of the openings 33 therein, cam 83 of the indexing mechanism 31 (Fig. 5) has been rotated so that the roller on the lever 85 engages the dwell 89 on the cam, thereby allowing lever 58 to be rotated in a clockwise direction by movement of the rod 51 upwardly by the spring 56 and placed in position to engage the stop 60a of the clutch 60 to disengage the clutch, whereby the driving connection between the motor 26 and turntable 10 is released. At this time, cam 82 will be positioned with its peaked portion engaging the roller 91 of the switch lever 92 and contacts 95 of the switch SW2 will be opened and contacts 94 of the switch will be closed. Opening of contacts 95 will break the holding circuit for the relay R2 with consequent deenergization of relay R2 and TDR. As a result, contacts TDR1 of relay TDR will open and break the circuit energizing relay R7, whereby the deenergization of relay R7 will break the circuit energizing solenoid S1, and the index pin 32 will be moved upwardly and be received within the aligned opening 33 in the turntable 10. When the contacts 94 close, a circuit will be completed to solenoids S3 and S5 energizing solenoid S5 at this time but not solenoid S3. Upon energization of solenoid S5, the armature S5a and valve body V5b will move upwardly to prevent the passage of air under pressure to the valve 133 of the fork-clamping device 11 holding the fork for heat-treating.

When the relay R7 deenergizes, its contacts R7a will open the circuit energizing the time delay relay TDR, whereby its contacts TDR2 will open deenergizing relay R2. At this time, the contacts R2b of the relay R2 will close completing a circuit for energizing relay R1 which readies it for subsequent operations. Also, contacts R2a will close to complete a circuit energizing solenoid S3, as previously described, and the armature S3b of the solenoid will move the valve body V1a upwardly to prevent the flow of air under pressure to the pneumatic device 178 and exhaust the air in the same, whereby the movable inductor coil-supporting mechanism will move downwardly to position the inductor coil in heating relation to the fork. This will start a new cycle of operations which then repeats automatically in the manner described above.

Considering now the electrical control arrangement of Figs. 25 and 26 for effecting only a single cycle of operations, when the switch SW7 is in its "repeat" position closing contacts SW7a and SW7b thereof, the cycles of operations will repeat automatically to successively harden the forks handled by the fork-handling mechanism A. That is, the apparatus will automatically index itself and position forks to be heat-treated in heating relation to the inductor coil without requiring any action from the operator. In the single cycle of operations, the contacts SW7c and SW7d of the switch SW7 are closed by the operator, and it is also required to close contacts SW8b and open contacts SW9a of switch SW9 in order to start the indexing operation, that is, closing contacts SW9b of switch SW9 will establish a circuit for energizing time delay relay TDR comprising the conductor P1; conductor C1; closed contacts of switches SW5 and SW3; conductor C34; winding of relay TDR; conductors C35, C40, and C47; closed contacts SW9b of switch SW9; to conductor P2. The electrical control arrangement will function as previously described from the energization of relay TDR effecting initiation of the indexing operation and subsequent operations of the electric controls to pull the index pin 32 out of the opening 33 in the turntable 10; the turntable rotates to position a fork in proximity to the induction-heating equipment B for heat treating by its inductor coil, the turntable stopping at this time and the index pin being positioned within another opening 33 in the turntable 10; the inductor coil is lowered into heating relation to the fork for a predetermined period of time and then raised; the heat-treated fork is plunged into the quenching fluid in the tank C and released by the associated fork-clamping device 11, when it then returns to its normal raised position. However, at this time, the apparatus will not function to institute a new cycle of operations, until the operator again closes the contacts SW8b of switch SW9, as the time delay relay TDR will not be energized to begin a new cycle of operations.

A desirable and advantageous feature of the electrical control arrangement is its adaptability for preselecting the amount of power the generator supplies to the inductor coil for heating the forks, especially in the automatic type of operations described. There are three possible methods of preselecting the amount of power the generator supplies to the inductor coil. One method has been previously described, wherein the contacts CS1 of the switch CS are closed in the "high" power position, and the power is controlled by the adjustment of the movable arm RH2 over the variable resistance coil RH1 of power control rheostat RH.

A second method is the same operation as previously described, except the power is controlled by way of power control rheostat 2RH which controls "low" power, and to provide this method, it is necessary to open contacts CS1 of the switch CS and close the contacts CS2 of the switch in the "low" power position, and also to adjust the movable arm 2RH1 over the variable resistance coil 2RH2 of the power control rheostat 2RH which controls the "low" power the generator will supply to the inductor coil. The power control rheostat 2RH is placed into the circuit including the rheostat, because relay R4 was energized as hereinafter will be described in explaining the next-referred-to method.

A third method is provided when the contacts CS1 and CS2 of the switch CS are in the position indicated "both" on the drawing, with the contacts CS1 and CS2 closed and with the contacts CS3 and CS4 closed. With the switch CS in the "both" position, the cycles of operations will be such as to control the generator to supply high power to the inductor coil to heat a fork; the fork is then quenched; then reheated at a low power the generator supplies to the inductor coil, again quenched, and removed from the associated clamping device 11. These cycles of operation are provided as follows:

Assuming the fork has been heated with high power supplied to the inductor coil by the generator and the lever 100 of the associated clamping device 11 has been operated to hold the fork in the coolant fluid in the tank C, at this particular cycle of operation previously described in the continuous or repeat cycles of operation provided by the electrical control arrangement, contacts R1a of relay R1 will open, but solenoid S5 will not be deenergized and the valve body V5b will not move downwardly to allow air under pressure to flow through the valve V5 to and through the valve 133 and to the pneumatic mechanism 104 of the clamping device 11 to release the fork, as the normally closed contacts R6d of the relay R6, in the circuit for energizing solenoid S5, are still closed so that the solenoid S5 will remain energized. Thereafter, normally closed contacts R1b will open breaking the circuit energizing solenoid S3 and, as a result, the valve body V1a will move downwardly to permit air to flow to the pneumatic device 178, whereupon the inductor coil will be moved upwardly out of heating relation to the fork. At the same time, contacts R1c of relay R1 will open, due to the energization of relay R1, to break the circuit energizing solenoid S4 and the valve body V2a of the valve V2 will move downwardly to allow air to flow to the front of the pneumatic device 129 to retract the piston 128a and rod 129, whereby the lever arm 100 of the clamping device 11 will be returned to its raised position with the fork still held on the device 11. Also, energization of relay R1 will close its contacts R1e which will establish a circuit energizing relay R5. This circuit comprises the conductor P1; conductors C1, C2 and C3; winding of relay R5; conductor C50; closed contacts R6c of relay R6; conductor C51; closed contacts R1e of relay R1; conductors C52 and C7; closed contacts 94 of switch SW2; closed contacts SW8a and SW9a of switches SW8 and SW9; to conductor P2. Relay R5 is a time delay closing relay and contacts R5c and R5e will close first, then contacts R5b will open; thereafter contacts R5a will open, and then contacts R5d will close. With relay R5 energized, contacts R5c and R5e will close first, and closed contacts R5c will complete a holding circuit for maintaining relay R5 energized; contacts R5b then will open to prevent initiation of the indexing operation; contacts R5a will then open and break the circuit energizing relay R1 so that, when the circuit is again completed, the energized relay will effect quenching of the fork. Now contacts R1b will close and complete the circuit energizing solenoid S3 to operate valve V1 to prevent the supply of air to the pneumatic device 178, whereupon the inductor coil will lower into heating relation to the fork and limit switch SW5 will open. Contacts R5d of relay R5 will be closed, when relay R5 is energized, and will close a circuit to relay R6, but this relay R6 is not energized, because contacts R1d of relay R1 are still open. The closing of contacts R5e of relay R5 will establish a circuit for energizing relay R4, whereby contacts R4a and R4b will open and contacts R4c and R4d will close. Simultaneously, the inductor coil-supporting frame will close switch SW4, and this will start the heating time period of the fork by energizing the timer solenoid TS, and the generator will then provide low power to the inductor coil in an amount determined by power control rheostat 2RH. Contacts TS1 will close a circuit energizing motor TM and R3, and R3a closes via contacts R4d and R4c. When the fork-heating period ends, the generator will be turned off and solenoid S4 and R6 energized, solenoid S4 will energize to effect actuation of the valve V2 to permit air to flow to the pneumatic device 129 to move piston 128a and rod 128 outwardly to rotate the lever 100 of the fork-clamping device 11 and plunge the heat-treated fork into the quenching fluid in the tank C. Relay R6 and solenoid S4 are energized simultaneously by way of contacts TS3 of solenoid TS and holding contacts R1b of relay R1 as previously described. Closing of contacts R6a of relay R6 will establish a holding circuit for relay R6 via conductors C30 and C6. Opening of contacts R6d will break the circuit energizing the solenoid S5, but this will not have any effect, as this circuit will only be broken when normally closed contacts R1a of relay R1 open. Closing of contacts R6b of relay R6 will prepare circuits for initiating the turntable-indexing operation as previously described. Opening of contacts R6c of relay R6 will break the circuit energizing relay R5 so that normally closed contacts R5b will close to partially establish circuits to initiate the indexing operation. Contacts R5a of relay R5 will close to establish a circuit energizing relay R1 which operates and starts timing. Opened contacts R1b will break the circuit energizing solenoid S3 to effect movement of the inductor coil upwardly out of heating relation to the fork. Closed contacts R1d will establish holding circuit for relay R1, the solenoid S4, relay R5 and the lever 100 of the device 11 will be moved to plunge and hold the heat-treated fork in the cooling fluid in the tank C. The electrical control arrangement will then become operative to repeat the same cycles of operations for successive shift forks to be hardened.

It may be noted, when the contacts CS2 and CS3 of switch CS are closed in the "low" power position of the switch and the contacts CS3 and CS4 are closed, power will flow through relay R4 energizing it to cause the normally closed contacts R4a and R4b to open and normally open contacts R4c and R4d to close so that the amount of power the generator supplies to the inductor coil is controlled by rheostat 2RH. Also, relay R6 will be energized at the proper time so that contacts R6b will close to initiate the indexing cycle at the proper time.

When the operator desires to load the work-handling devices 11 previous to establishing the automatic single or repeat cycles of operations of the apparatus, it will be necessary to place the forks on the clamping devices 11. The following circuits of the electrical control arrangement will operate to effect indexing of the turntable for this purpose:

Switch SW8 is operated to open its contacts SW8a, this will deenergize solenoids S3 and S5, and with these solenoids unable to be energized, the inductor coil will be maintained in its raised position and contacts of limit switches SW5 and SW3 will remain closed. The operator will place a fork on one of the clamping devices 11 and then press switch SW8 to close contacts SW8b of the switch. Since the contacts of limit switches SW5 and SW3 are closed, relays R7 and TDR are energized by circuits previously described. As a result, solenoid S1 is energized and the index pin 32 will be pulled out of an opening 33 in the turntable 10; solenoid S2 is energized to effect engagement of the clutch 60, and the turntable will be rotated to position the next opening 33 (in a counter-clockwise direction—Fig. 2) in the turntable above the pin 32. At this time, contacts 95 of switch SW2 are open and contacts 94 of switch SW2 closed, with the result, solenoids S1 and S2 will be deenergized, and the pin 32 will be positioned within this opening 33 in the turntable. The operator may then position a fork on another fork-clamping device 11. By pressing and releasing switch SW8 to close contacts SW8b of the switch, the indexing cycle will be repeated until all of the forks are positioned on the devices 11. The operator may then operate switch SW8 to open contacts SW8b and close contacts SW8a for initiating complete automatic indexing, heating and quenching cycles of the apparatus.

From the foregoing description, it will be apparent that we have attained the objects of our invention. While this invention has been described in detail in its present preferred form or embodiment, we wish it to be understood that various changes and modifications may be made therein without departing from the spirit or scope thereof. It is aimed in the appended claims to cover all such changes and modifications.

We claim:

1. Apparatus for handling and surface-hardening articles comprising heating means; a receptacle containing a fluid medium; movable means supporting a plurality of spaced articles to be heat-treated and including devices mounted for movement independently of each other and releasably holding said articles; means for moving said supporting means; control means for periodically effecting operation of said moving means to move said supporting means to successively position said devices and thereby said articles adjacent to said heating means; a carrier for said heating means and movable to position said heating means into and out of heating relation with the article positioned adjacent thereto and means controlling movement of said carrier to move said carrier and thereby said heating means into and out of heating relation with the article positioned adjacent thereto and then effecting movement of each device to immerse the article held thereby in said fluid medium thereafter to actuate said device to release the article in said fluid medium.

2. Apparatus for handling and surface-hardening articles comprising heating means; a receptacle containing a fluid medium; a support member mounted for rotation about a vertical axis and fixed against movement along said axis; devices holding a plurality of articles to be surface-hardened, rotatable with said support member, and supported on said support member for movement toward and into the fluid medium in said receptacle; means for rotating said support member; means for moving said devices; and time-controlled means for said rotating and moving means to effect operation of said rotating means to periodically rotate said support means to successively position each device and the article held thereby adjacent said heating means and thereafter to effect operation of said moving means to move the device for immersing the heat-treated article held thereby into the fluid medium in said receptacle and actuating said device to release the article.

3. Apparatus for handling and surface-hardening articles comprising heating means; a receptacle containing a fluid medium; a support member mounted adjacent to said heating means and movable relative thereto; holders movably mounted on said support and carrying articles to be surface-hardened; means for moving said support including power means, and a device between said power means and said support and operative to provide a driving connection between said power means and said support and to break said driving connection; means for moving each of said holders independently of the other holders; means for moving said heating means into and out of heating relation with an adjacent article; mechanism associated with each holder and operative to disengage the article held thereby from the holder; and automatic control means for said device, said holder-moving means, said heating means-moving means, and said mechanisms, to effect continuous cycles of operations, each cycle comprising operation of said device to drivingly connect said power means and said support to move said support to position one of said holders and thereby the article held thereby adjacent to said heating means, said heating means-moving means to move said heating means into and out of heating relation with the article positioned adjacent thereto, said holder-moving means to move the holder and the heat-treated article thereby to position the heat-treated article in said fluid medium, mechanism associated with the holder carrying the heat-treated article to release the heat-treated article from the holder, said device to drivingly connect said power means with said support to move said support to position another article adjacent to said heating means, and said heating means-moving means to move said heating means into heating relation with said last-mentioned article.

4. Apparatus for handling and surface-hardening articles comprising heating means; a receptacle containing a fluid medium; a support mounted for rotation about an axis and fixed against movement along said axis; holders movably mounted independently of each other on said support and rotatable therewith, each of said devices being arranged in annular array about the axis of rotation of said support and holding an article to be surface-hardened; means for rotating said support, including power means, and a device operative to connect and disconnect said power means and said support; means for moving each holder independently of the other holders; means for moving said heating means into and out of heating relation with an article positioned adjacent thereto by said support; mechanism associated with each holder for disengaging the article carried thereby from the holder; and automatic control means for said device, said holder-moving means, said heating means-moving means, and said mechanisms to effect continuous cycles of operations, each cycle comprising the following operations in sequence: operation of said device to drivingly connect said power means and said support to rotate said support to position an article adjacent said heating means and to disconnect said power means and support, operation of the heating means-moving means to move the heating means into heating relation with the article positioned adjacent thereto by said support, operation of said holder-moving means to move the holder carrying the heat-treated article to position the heat-treated article in said fluid medium, operation of said mechanism of the holder, carrying the heat-treated and quenched article, to release the article, operation of said device to connect said power means and said support to rotate said support to position another article adjacent to the heating means.

5. In apparatus for handling and surface-hardening articles comprising induction heating means including an inductor coil adapted to be disposed in heat-treating relation to articles to be surface-hardened; a receptacle containing liquid for quenching articles heat-treated by said coil; a machine for successively presenting to said inductor coil a plurality of articles for heat-treatment and for immersing the heat-treated articles into the liquid in said receptacle, said machine comprising a rotatable turntable positioned adjacent said induction heating machine and fixed against movement along the axis of rotation thereof, a plurality of devices pivotally mounted on said turntable and disposed in spaced relation about the axis of rotation of said turntable and each comprising mechanism for releasably holding an article, said turntable having an opening therein adjacent each of said devices, a pin movable into said openings, mechanism for moving said pin into each opening in said turntable, a motor, the improvement residing in a gear train between said motor and said turntable, a clutch associated with said gear train and operative to provide a driving connection between said motor and said gear train for rotating said turntable and to break said driving connection, cam means for controlling operation of said clutch; pneumatic means for controlling movement of said inductor coil into and out of heat-treating relation to each article when positioned adjacent thereto; pneumatic means operative to rotate each device to immerse the article supported thereby into the liquid in said receptacle; a supply of air under pressure; a valve associated with each device and controlling the flow of pressure air to operate the pneumatic mechanism thereof to release the article held thereby, each of said devices having a member adapted to engage and operate said valve upon rotation of said device to effect release of the heat-treated article in the quenching liquid in said receptacle, a valve controlling the supply of pressure air to said pneumatic means of said inductor coil-moving mechanism, a valve for controlling the flow of pressure air to the pneumatic means for rotating each device; and an electrical control arrangement comprising a solenoid adapted when energized to move said pin out of an opening in said turntable, and automatic control means for effecting continuous cycles of operations of said machine and inductor coil, each cycle including operation of said valve, associated with said coil-moving pneumatic means, to effect movement of said coil into heat-treating relation with an adjacent article for a predetermined period of time and then effecting movement of the coil out of heat-treating relation, operation of the valve controlling the supply of air under pressure to the pneumatic means for rotating the device holding the heat-treated article to move the heat-treated article into the liquid in said receptacle and to engage said member of said last-mentioned device with its associated valve to release the heat-treated article in the liquid in the receptacle, energizing said solenoid to remove said pin from an opening in said turntable, effecting operation of the cam means controlling the clutch to effect engagement of the clutch to rotate said turntable to position an article held by another device into proximity to the inductor coil and then effecting disengagement of the clutch, and deenergizing said solenoid and effecting operation of the mechanism controlling movement of said pin to position said pin within an opening in the turntable.

6. In apparatus for handling and surface-hardening articles comprising induction heating means including an inductor coil adapted to be disposed in heat-treating relation to articles to be surface-hardened; a receptacle containing liquid for quenching articles heat-treated by said coil; a machine for successively presenting to said inductor coil a plurality of articles for heat-treatment and for immersing the heat-treated articles into the liquid in said receptacle, said machine comprising a rotatable turntable positioned adjacent said induction heating machine and fixed against movement along the axis of rotation thereof, a plurality of devices pivotally mounted on said turntable and disposed in spaced relation about the axis of rotation of said turntable and each comprising means for releasably holding an article, said turntable having an opening therein adjacent each of said devices, a pin movable into said openings, means for moving said pin into each opening in said turntable, a motor, the improvement residing in a gear train between said motor and said turntable, a clutch associated with said gear train and operative to provide a driving connection between said motor and said gear train for rotating said turntable and operative to break said driving connection, cam means for controlling operation of said clutch; power means for controlling movement of said inductor coil into and out of heat-treating relation to each article when positioned adjacent thereto; power means operative to rotate each device to immerse the article supported thereby into the liquid in said receptacle; a control member associated with each device and controlling operation of said article-holding means thereof to release the article held thereby and operable by said device upon rotation of said device to position the heat-treated article in the liquid in said receptacle; means controlling operation of said coil-moving means; and an electrical control arrangement comprising a solenoid adapted when energized to move said pin out of an opening in said turntable, and including automatic control means for effecting continuous cycles of operations of said machine and coil, each cycle including operation of said means controlling operation of said coil-moving means to move said coil into heat-treating relation with an adjacent article for a predetermined period of time and then raising the coil out of heat-treating relation, effecting operation of said power means for rotating the device holding the heat-treated article to move said heat-treated article into the liquid in said receptacle and to operate said member of said last-mentioned device to release the heat-treated article in the liquid in the receptacle, energizing said solenoid to remove said pin from an opening in said turntable, effecting operation of the cam means controlling the clutch to effect engagement of the clutch to rotate said turntable to position an article held by another device into proximity to the inductor coil and then effecting disengagement of the clutch, deenergizing said solenoid and effecting operation of the mechanism controlling movement of said pin to position said pin within an opening in the turntable.

7. Apparatus for heat-treating in succession a plurality of articles, such apparatus comprising means rotatable about a vertical axis and fixed against movement along said axis and supporting in spaced relationship a plurality of articles to be heat-treated and including a plurality of vertically movable fixtures holding said articles and actuatable to release said articles; means for heating selected surface portions of the articles; means for raising and lowering said heating means into and out of heating relation with said articles; means for intermittently rotating said supporting means to position said articles successively beneath said heating means; a receptacle in vertical alignment with said heating means and containing a quenching liquid for cooling the heated surface portions of said articles so as to harden the same; means for causing said actuating means to lower said heating means into heating relation with an article for heat-treating the article at the termination of each intermittent rotation of said supporting means and to then raise said heating means; and means actuating the fixture holding the heated article to move the article downwardly into said quenching liquid for hardening the heated surface portions of the article and to release the article in the quenching liquid.

8. Apparatus for heat-treating in succession a plurality of articles comprising a support pivotal about a vertical axis and fixed against movement along said axis and including a plurality of spaced apart vertically movable fixtures for holding said articles and having raised and lowered positions, said fixtures including mechanism actuatable to release said articles in the lowered position of the fixtures; means for heating selected surface portions of said articles; a receptacle containing a quenching liquid for cooling the heated surface portions of said articles so as to harden the same; means for intermittently rotating said support to position said articles successively between and in vertical alignment with said heating means and receptacle; a carrier for said heating means and vertically movable to lower said heating means into heating relation with an article and to raise said heating means out of heating relation with the article; operating means for moving said carrier; actuating means for causing said fixtures to pivot upwardly to the raised position thereof and downwardly to the lowered position thereof and to energize said mechanisms thereof to release said articles in the lowered positions of the fixtures; and time-controlled means for controlling the operation of said operating means and said actuating means, whereby said carrier is caused to lower said heating means into heating relation with an article held by a fixture in its upper position for a predetermined period of time, and the fixture is caused to pivot downwardly to immerse the heated article in the quenching liquid in the receptacle for hardening the heated surface portions of the article and to energize the mechanism of the fixture to release the heated article in the receptacle at the termination of intermittent rotational movements of said support.

9. Apparatus as defined in claim 8 in which said operating means and actuating means include pressure fluid operated devices; and said time-controlled means includes valves controlling the supply of pressure fluid thereto for effecting operation thereof, and an electrical control system including solenoids operating said valves, and a plurality of time-delay relays operating to energize said solenoids successively to sequentially actuate said valves and thereby said pressure fluid operated devices.

ROBERT J. PETERS.
JOHN R. GUENTHER.
JOSEPH W. POLLARD.

REFERENCES CITED

The following references are of record in the file of this patent:

UNITED STATES PATENTS

| Number | Name | Date |
|---|---|---|
| 1,425,660 | Josephs et al. | Aug. 15, 1922 |
| 1,525,192 | McFarland | Feb. 3, 1925 |
| 1,759,603 | Bissell | May 20, 1930 |
| 1,854,453 | Cramer | Apr. 19, 1932 |
| 2,199,313 | Holler et al. | Apr. 30, 1940 |
| 2,238,082 | Somes | Apr. 15, 1941 |
| 2,261,624 | Inskeep | Nov. 4, 1941 |
| 2,271,916 | Denneen et al. | Feb. 3, 1942 |
| 2,280,064 | Denneen et al. | Apr. 21, 1942 |
| 2,294,891 | Bullock et al. | Sept. 8, 1942 |
| 2,324,525 | Mittlemann | July 20, 1943 |
| 2,325,079 | Soderholm | July 27, 1943 |
| 2,338,496 | Denneen et al. | Jan. 4, 1944 |
| 2,341,120 | Rudd et al. | Feb. 8, 1944 |
| 2,361,517 | White et al. | Oct. 31, 1944 |
| 2,424,794 | Brown | July 29, 1947 |
| 2,425,751 | McGuire, Jr. | Aug. 19, 1947 |
| 2,429,776 | Shorter | Oct. 28, 1947 |
| 2,445,822 | Briechle | July 27, 1948 |
| 2,454,039 | Cox | Nov. 16, 1948 |
| 2,470,311 | Hoyler et al. | May 17, 1949 |
| 2,477,129 | Johnson | July 26, 1949 |
| 2,493,785 | Strickland et al. | Jan. 10, 1950 |
| 2,506,425 | Journeaux | May 2, 1950 |
| 2,515,086 | Hess et al. | July 11, 1950 |